United States Patent
Lin et al.

(10) Patent No.: US 10,652,510 B2
(45) Date of Patent: May 12, 2020

(54) PROJECTION SYSTEM AND AUTOMATIC SETTING METHOD THEREOF

(71) Applicant: Coretronic Corporation, Hsin-Chu (TW)

(72) Inventors: Chi-Wei Lin, Hsin-Chu (TW); Chien-Chun Peng, Hsin-Chu (TW); Yung-Chiao Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/145,198

(22) Filed: Sep. 28, 2018

(65) Prior Publication Data

US 2019/0104289 A1    Apr. 4, 2019

(30) Foreign Application Priority Data

Sep. 29, 2017   (CN) .......................... 2017 1 0910336

(51) Int. Cl.
*H04N 3/22* (2006.01)
*H04N 3/26* (2006.01)
(Continued)

(52) U.S. Cl.
CPC ............. *H04N 9/3185* (2013.01); *G06T 7/74* (2017.01); *H04N 9/3147* (2013.01);
(Continued)

(58) Field of Classification Search
CPC .......... H04N 5/64; H04N 9/31; H04N 9/3185; H04N 9/3147; H04N 9/3191;
(Continued)

(56) References Cited

U.S. PATENT DOCUMENTS 6,222,593 B1   4/2001   Higurashi et al.
6,377,306 B1   4/2002   Johnson et al.
(Continued)

FOREIGN PATENT DOCUMENTS

CN   103841343   6/2014
CN   103942796   7/2014
(Continued)

OTHER PUBLICATIONS

"Office Action of Taiwan Counterpart Application," dated Dec. 6, 2018, p. 1-p. 6.

*Primary Examiner* — Trang U Tran
(74) *Attorney, Agent, or Firm* — JCIPRNET

(57) ABSTRACT

A projection system including a processing device and a first projector is provided. The first projector includes a first projection unit and a first image capturing unit. The first projection unit is configured to sequentially project a first reference image and a second reference image. The first image capturing unit is configured to sequentially obtain a first captured image and a second captured image. The processing device is adapted to compare the first captured image and the second captured image to obtain a position of an image region having a pixel value change among the first captured image and the second captured image. The processing device defines the position of the image region having the pixel value change as a valid identification region. In addition, an automatic setting method is also provided.

16 Claims, 15 Drawing Sheets

(51) Int. Cl.
*H04N 9/31* (2006.01)
*G06T 7/73* (2017.01)

(52) U.S. Cl.
CPC ......... *H04N 9/3191* (2013.01); *H04N 9/3194* (2013.01); *G06T 2207/20224* (2013.01)

(58) Field of Classification Search
CPC .......... H04N 9/3194; H04N 3/22; H04N 3/26; G06T 7/74; G06T 2207/20224
USPC ........................................ 348/744, 745, 189
See application file for complete search history.

(56) References Cited

U.S. PATENT DOCUMENTS

| | | | |
|---|---|---|---|
| 6,456,339 | B1 | 9/2002 | Surati et al. |
| 8,950,872 | B2 * | 2/2015 | Hasegawa ............ H04N 9/3194 353/70 |
| 9,344,695 | B2 * | 5/2016 | Shibata ................ H04N 9/3185 |
| 9,654,750 | B2 * | 5/2017 | Kunieda .............. G03B 21/147 |
| 2002/0008697 | A1 | 1/2002 | Deering |
| 2003/0156262 | A1 | 8/2003 | Baker et al. |
| 2004/0227908 | A1 | 11/2004 | Wada et al. |
| 2005/0128196 | A1 | 6/2005 | Popescu et al. |
| 2007/0279522 | A1 | 12/2007 | Gilg et al. |
| 2010/0111441 | A1 | 5/2010 | Xiong et al. |
| 2011/0007172 | A1 | 1/2011 | Miceli |
| 2013/0169888 | A1 | 7/2013 | Tannhauser et al. |

FOREIGN PATENT DOCUMENTS

| | | |
|---|---|---|
| CN | 105308503 | 2/2016 |
| CN | 105376540 | 3/2016 |
| TW | 337001 | 7/1998 |
| TW | 201319715 | 5/2013 |
| TW | I454147 | 9/2014 |
| TW | 201633277 | 9/2016 |
| TW | I592020 | 7/2017 |

* cited by examiner

PROJECTION SYSTEM AND AUTOMATIC SETTING METHOD THEREOF

CROSS-REFERENCE TO RELATED APPLICATION

This application claims the priority benefit of China application serial no. 201710910336.5, filed on Sep. 29, 2017. The entirety of the above-mentioned patent application is hereby incorporated by reference herein and made a part of this specification.

BACKGROUND

1. Field of the Invention

The invention relates to a projection technique, and more particularly, to a projection system and an automatic setting method thereof.

2. Description of Related Art

In general, a plurality of projectors may be integrated as one projection system for projecting stitching image frames in large area. In other words, the projectors can project a plurality project partial image frames so the partial images can be integrated on a projection plane in order to display an integrated image frame in large area. However, in the conventional art, a common projection system usually requires a large number of devices to be disposed, and requires complex manual settings to be made on the projectors (i.e., setting parameters must be manually adjusted for each of the projectors). Consequently, it takes a lot of time to set up the projection system, which results in an increasing installation cost for the projection system. Therefore, finding a way to provide the projection system with advantage of easy set up while allowing the projection system to automatically adjust related setting parameters in an automatic setting manner so the projectors can accurately project the partial image frames onto the projection plane to be integrated into the integrated image frame in large area is one of the important issues to be addressed.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projection system and an automatic setting method thereof, which are capable of automatically determining a valid identification region of captured images captured by projectors of the projection system and automatically adjusting projection image ranges of the projectors to integrate projection images of the projectors into one integrated projection image with favorable projection quality.

To achieve one, a part, or all of the objectives or other objectives, an embodiment of the invention provides an automatic setting method adapted to a projection system. The projection system includes a processing device and a first projector. The first projector includes a first projection unit and a first image capturing unit. The method includes: projecting a first reference image onto a projection plane by the first projection unit, and capturing the first reference image on the projection plane by the first image capturing unit to obtain a first captured image; projecting a second reference image onto the projection plane by the first projection unit, and capturing the second reference image on the projection plane by the first image capturing unit to obtain a second captured image; and comparing the first captured image and the second captured image to obtain a position of an image region having a pixel value change among the first captured image and the second captured image, and defining the position of the image region having the pixel value change as a valid identification region.

To achieve one, a part, or all of the objectives or other objectives, an embodiment of the invention provides a projection system including a processing device and a first projector. The first projector is coupled to the processing device. The first projector includes a first projection unit and a first image capturing unit. The first projection unit is configured to project a first reference image onto a projection plane. The first image capturing unit is configured to capture the first reference image on the projection plane to obtain a first captured image. The processing device projects a second reference image onto the projection plane by the first projection unit. The processing device captures the second reference image on the projection plane by the first image capturing unit to obtain a second captured image. The processing device is adapted to compare the first captured image and the second captured image to obtain a position of an image region having a pixel value change among the first captured image and the second captured image. The processing device defines the position of the image region having the pixel value change as a valid identification region.

Based on the above, the projection system and the automatic setting method thereof of the invention can effectively determine the valid identification region in the captured images captured by the projectors so as to effectively reduce time for image analysis and computing as well as data computing amount. Moreover, the projection system and the automatic setting method thereof of the invention can automatically integrate the projection images of the projectors into one integrated projection image with favorable projection quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
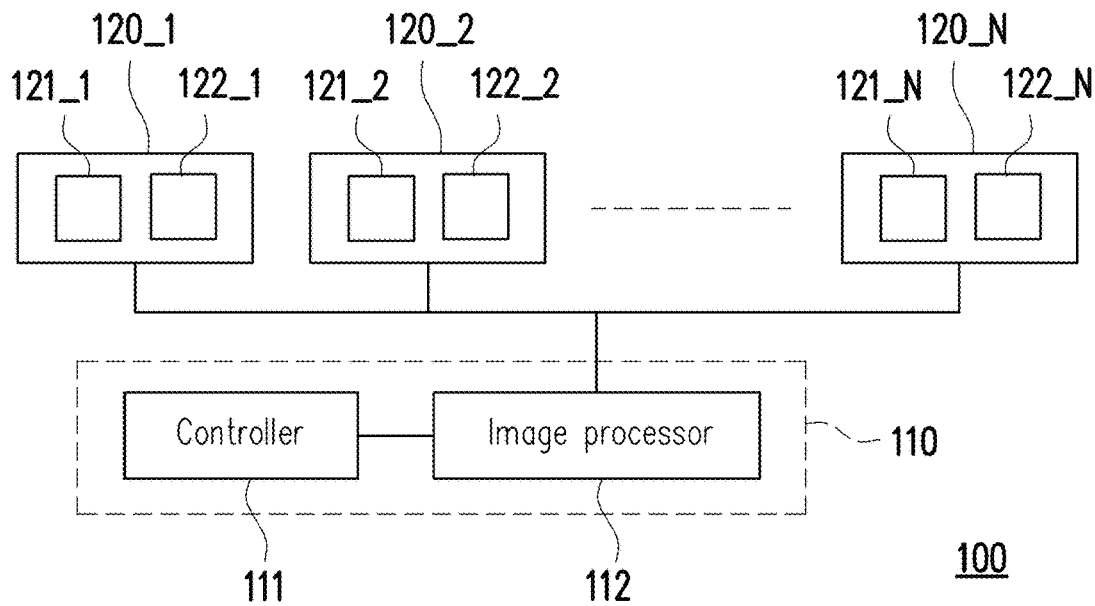
FIG. 1 is a schematic diagram illustrating a projection system in an embodiment of the invention.

FIG. 1 is a schematic diagram illustrating a projection system in an embodiment of the invention. With reference to FIG. 1, a projection system 100 includes a processing device 110 and a plurality of projectors 120_1, 120_2 to 120_N, wherein N is a positive integer greater than 0. The processing device 110 includes a controller 111 and an image processor 112. The projectors 120_1, 120_2 to 120_N include projection units 121_1, 121_2 to 121_N and image capturing units 122_1, 122_2 to 122_N, respectively. In the embodiment, the projection units 121_1, 121_2 to 121_N may further include a light source module (e.g., a lighting apparatus having a discharge lamp, a light-emitting diode or a laser device), a light machine (which includes a light modulator, such as a reflective or transmissive space light modulator; the reflective space light modulator includes a liquid crystal on silicon (LCOS), a digital micro-mirror device (DMD), etc.; the transmissive space light modulator includes a transparent liquid crystal panel, etc.). Further, based on different methods for inputting control signals, the light modulator includes, for example, an optically addressed spatial light modulator (OASLM) or an electrically addressed spatial light modulator (EASLM), a projection lens group (including a plurality of lenses) and an image output unit (e.g., an I/O port or an interface for outputting signal, which can transmit an image content signal (video signal) or a control signal through Bluetooth, Wi-Fi, Zigbee or other wireless methods as well as an optical fiber or other wired transmission interfaces). The image capturing units 122_1, 122_2 to 122_N may be cameras. In the embodiment, the projection system 100 projects a plurality of image frames by the projectors 120_1, 120_2 to 120_N, and presents one integrated image frame by integrating these image frames. The projection system 100 captures a plurality of captured images from respective image capturing areas on a projection plane (e.g., FIG. 3A) by the image capturing units 122_1, 122_2 to 122_N. Afterwards, the processing device 110 can analyze the captured images captured by the image capturing units 122_1, 122_2 to 122_N and compare the captured images with the image frames projected by the corresponding projectors 120_1, 120_2 to 120_N in order to adjust related projection settings for the projectors 120_1, 120_2 to 120_N. In addition, a capturing range of the image capturing units 122_1, 122_2 to 122_N is greater than a projecting range of the projectors 120_1, 120_2 to 120_N.

In the embodiment, the controller 111 may be disposed in, for example, a desktop computer, a personal computer (PC), a portable terminal product, a personal digital assistor (PDA), a tablet PC, etc. Further, the controller 111 may include a central processing unit (CPU) with image data processing and computing functions, or other programmable devices for general purpose or special purpose, such as a microprocessor, a digital signal processor (DSP), an image processing unit (IPU), a graphics processing unit (GPU), a programmable controller, an application specific integrated circuits (ASIC), a programmable logic device (PLD), other similar processing devices or a combination of the above devices.

In the embodiment, each of the controller 111 and the image processor 112 may further include a storage device. The storage device may be used to store image processing programs, image data, data computing programs or coordinate conversion equations. In the embodiment, the controller 111 may be used to execute an analysis operation for the captured images, an integration operation for the image frames and various image processing operations. In the embodiment, the image processor 112 is, for example, a blending box (e.g., Optoma, GB-200 multifunctional image warping and blending processor). Further, the image processor 112 may be disposed outside the controller 111 or integrated with the controller 111 as the same device. However, the invention is not limited thereto.

In the embodiment, the image processor 112 is coupled to the controller 111. The controller 111 is configured to output image frame data, control signals and image frame integration setting values to the image processor 112 so the image processor 112 can distribute the image frame data provided by the controller 111 according to the image frame integration setting values. The image processor 112 can transmit the distributed image frame data and the related projection setting values to the projectors 120_1, 120_2 to 120_N respectively so each of the projectors 120_1, 120_2 to 120_N can project a partial image frame relative to the distributed image frame data in order to display one integrated image frame. Here, the image frame data refers to image content files or image files predetermined to be projected, and the control signals are used to control operations of the projectors and the image capturing units.

In another embodiment, the controller 111 is coupled to the image processor 112, and the controller 111 is configured to output the image frame data to the image processor 112. The image processor 112 then transmits the image frame data to the projectors 120_1, 120_2 to 120_N for projecting the image frames relative to the image frame data. Further, the controller 111 is coupled to the projectors 120_1, 120_2 to 120_N to provide the control signals to the image processor 112 and the projectors 120_1, 120_2 to 120_N by other transmission means (e.g., RJ-45) so as to control operations of the image processor 112 and the projectors 120_1, 120_2 to 120_N.

In other embodiments, the controller 111 is coupled to the image processor 112, and the controller 111 is configured to output the image frame data and the control signals to the image processor 112. After that, the image processor 112 transmits the image frame data to the projectors 120_1, 120_2 to 120_N for projecting the image frames relative to the image frame data.

Specifically, before the projection system 100 executes normal projection tasks, the projection system 100 can utilize the controller 111 to automatically set the projectors 120_1, 120_2 to 120_N and automatically set the image frame integration setting values in advance. When the projection system 100 is executing the normal projection tasks, the image processor 112 can process the image frames provided by the controller 111 according to the automatically set image frame integration setting values so as to drive the projectors 120_1, 120_2 to 120_N for projecting the image frames. In the embodiment, the projectors 120_1, 120_2 to 120_N can project multiple image frames onto the same position or different positions on the projection plane.

Figure 2:
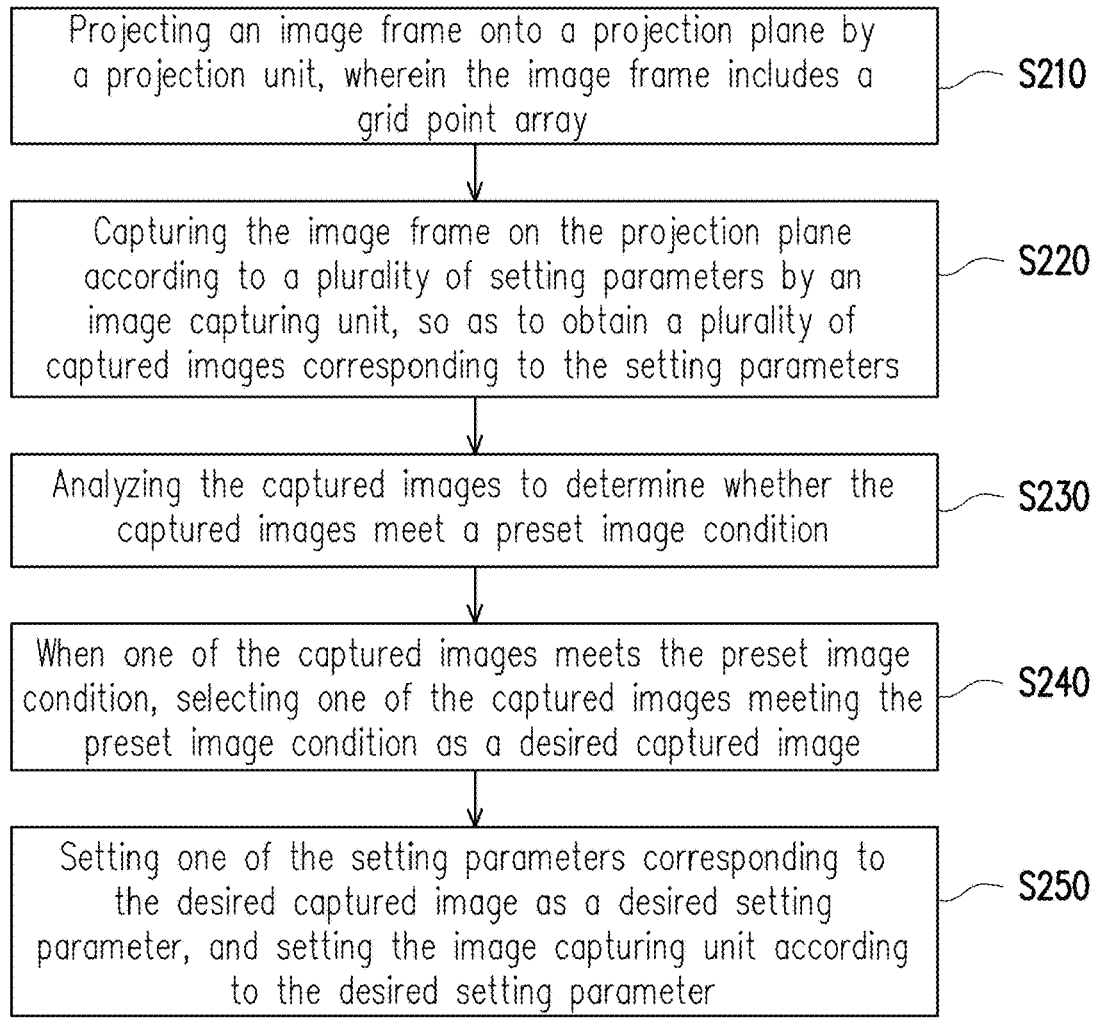
FIG. 2 is a flowchart illustrating an automatic setting method in an embodiment of the invention.

FIG. 2 is a flowchart illustrating an automatic setting method in an embodiment of the invention. With reference to FIG. 1 and FIG. 2, the automatic setting method of FIG. 2 is adapted to the projection system 100 of FIG. 1. In step S210, the projectors 121_1, 121_2 to 121_N project a plurality of image frames onto a projection plane, wherein each of the image frames includes a grid point array. In step S220, the image capturing units 122_1, 122_2 to 122_N separately capture the image frames on the projection plane according to a plurality of setting parameters to obtain a plurality of captured images corresponding to the setting parameters. In step S230, the processing device 110 can analyze the captured images to separately determine whether the captured images meet a preset image condition. In step S240, when one of the captured images meets the preset image condition, the processing device 110 selects the one of the captured images meeting the image condition as a desired captured image. In step S250, the processing device 110 sets one of the setting parameters corresponding to the desired captured image as a desired setting parameter, and sets the image capturing units according to the desired setting parameter. In manufacturing, each of the image capturing units 122_1, 122_2 to 122_N may have different image-capturing functions. Therefore, based on the method described above, the processing device 110 can automatically and separately set the image capturing units 122_1, 122_2 to 122_N so the image capturing units 122_1, 122_2 to 122_N can capture the captured images with favorable picture quality, which can assist the processing device 110 to effectively and accurately analyze the captured images.

In other words, in the embodiment, the projectors 120_1, 120_2 to 120_N of the projection system 100 can execute the setting parameters of the image capturing units 122_1, 122_2 to 122_N in advance so the image capturing units 122_1, 121_2 to 122_N can obtain the captured images with favorable picture quality. In this way, each the projectors 120_1, 120_2 to 120_N can automatically execute an adjustment for the image frame so the processing device 110 can effectively analyze or compare the captured images provided by the projectors 120_1, 120_2 to 120_N and the corresponding image frames thereby effectively preventing misjudgments. Description is provided below in more details using schematic diagrams of FIG. 3 to FIG. 4D.

Figure 3A:
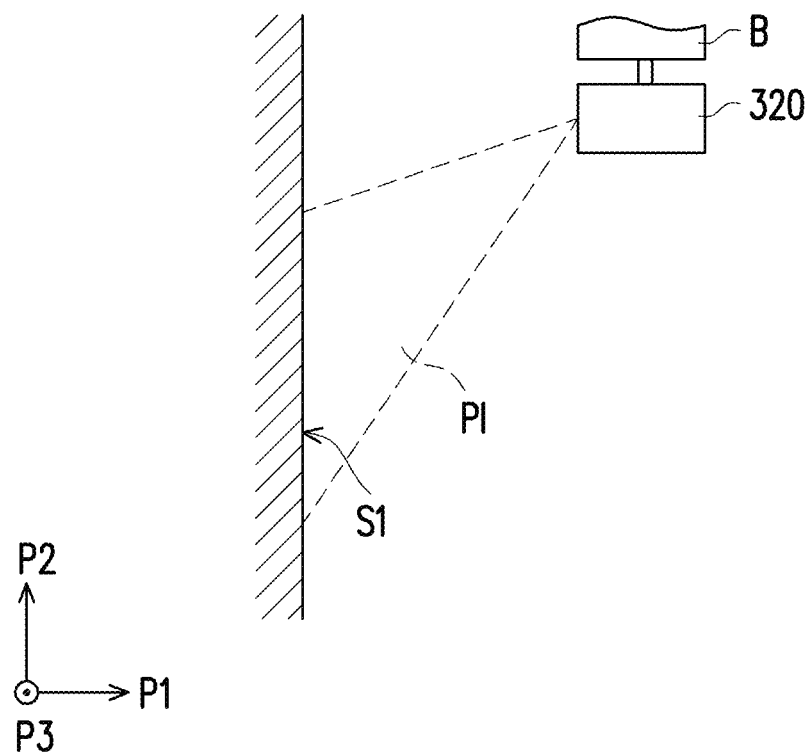
FIG. 3A is a side view of a projector in an embodiment of the invention.
Figure 4A:
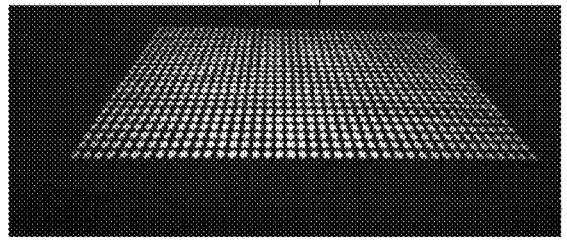
FIG. 4A to FIG. 4D are schematic diagrams illustrating captured images in another embodiment of the invention.
Figure 4B:
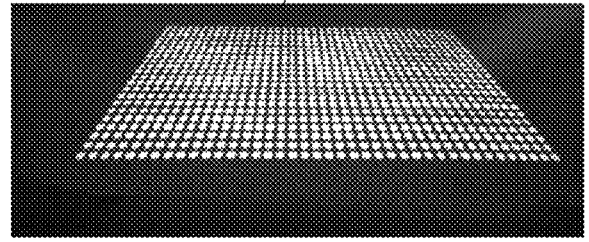
Figure 4C:
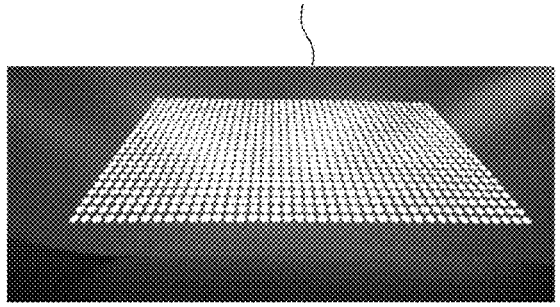
Figure 4D:
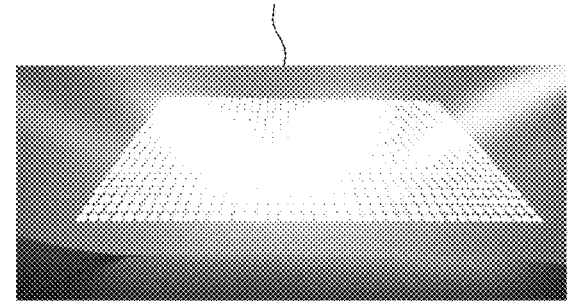

FIG. 3A is a side view of a projector in an embodiment of the invention. With reference to FIG. 3A, in the embodiment, a projector 320 is mounted onto a fixed target B. Also, the projector 320 is disposed above a projection plane S1 so the projector 320 can project an image light source PI onto the projection plane S1 from top to bottom. Here, the projection plane S1 is a plane formed by a second direction P2 and a third direction P3. In the embodiment, the fixed target B can extend on a plane formed by a first direction P1 and the third direction P3. Also, the fixed target B may be, for example, a ceiling or a supporting member, and the projection plane S1 may be a curtain or a wall. In other embodiments, the fixed target B may also extend on the plane formed by the second direction P2 and the third direction P3, which is not particularly limited in the invention. The first direction P1, the second direction P2 and the third direction P3 are perpendicular to one another. It should be noted that, a disposition method for the projectors described in each of the embodiments of the invention is not limited by what illustrated in FIG. 3A. In an embodiment, the projector 320 may also be disposed below the projection plane S1 so the projector 320 can project the image light source PI onto the projection plane S1 from bottom to top.

Figure 3B:
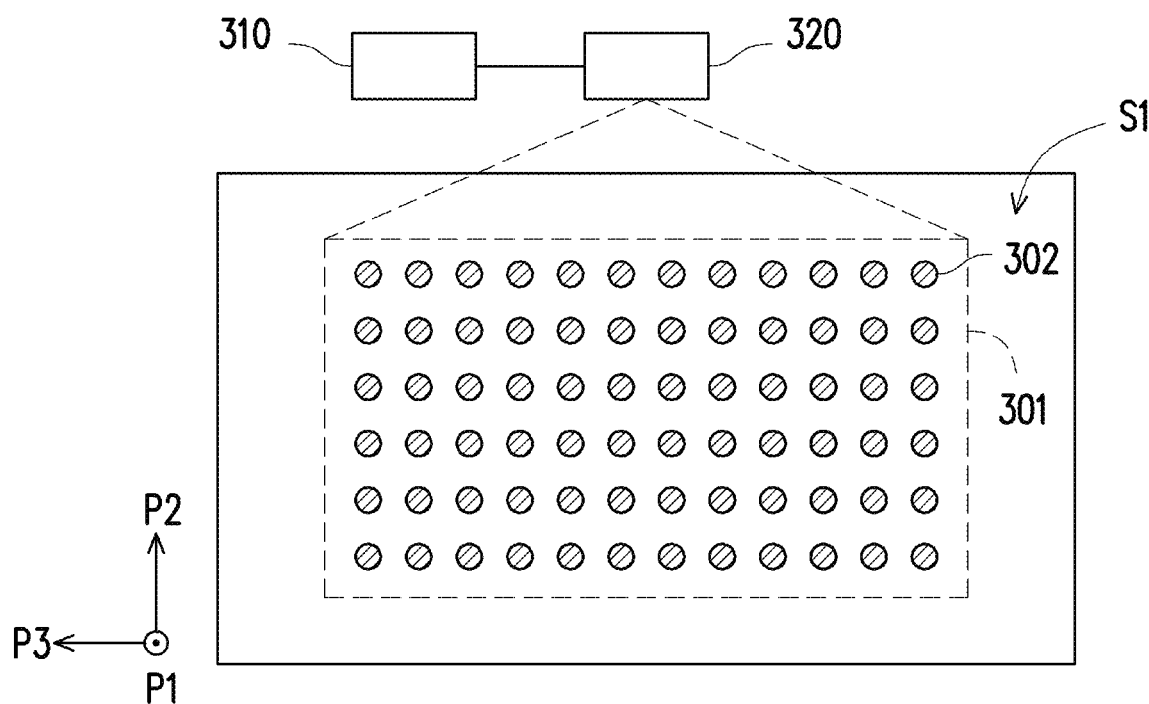
FIG. 3B is a schematic diagram illustrating an image frame in an embodiment of the invention.
Figure 3C:
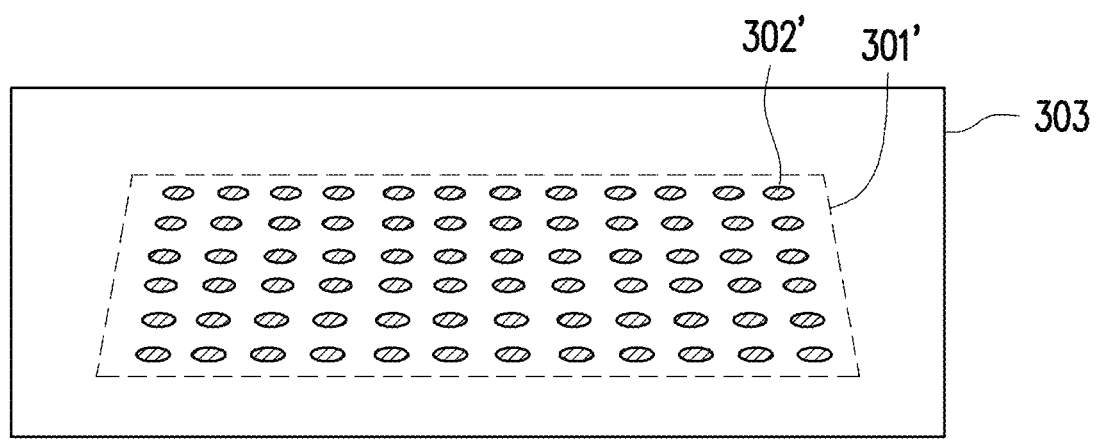
FIG. 3C is a schematic diagram illustrating a captured image in an embodiment of the invention.

FIG. 3B is a schematic diagram illustrating an image frame in an embodiment of the invention. FIG. 3C is a schematic diagram illustrating a captured image in an embodiment of the invention. With reference to FIG. 2 to FIG. 3C, in the embodiment, a processing device 310 is coupled to a projector 320. First of all, a projection unit of the projector 320 projects an image frame 301 as shown in FIG. 3B onto the projection plane S1, wherein the image frame 301 include a grid point array 302. In the embodiment, the grid point array 302 is formed by a plurality of grid points arranged in sequence, and the grid points have an identical size and an equal distance spaced apart from the others. Next, an image capturing unit of the projector 320 captures the image frame on the projection plane S1 according to a plurality of setting parameters to obtain a plurality of captured images corresponding to the setting parameters. Here, one of the captured images may be, for example, a captured image 303 shown in FIG. 3C. It should be noted that, the image frame 301 projected by the projection unit of the projector 320 viewing from the front is shown by FIG. 3B. Because the captured image 303 is captured by the image capturing unit of the projector 320 from a position of the projector 320, an image frame 301' and a grid point array 302' in the captured image 303 are displayed in a frame tilted by an angle. In the embodiment, a size range of the captured image 303 is greater than a size range of the image frame 301.

For instance, FIG. 4A to FIG. 4D are schematic diagrams for captured image in another embodiment of the invention. With reference to FIG. 2 to FIG. 4D, the captured images obtained according to the setting parameters by the image capturing unit of the projector 320 may be, for example, captured images 303A, 303B, 303C and 303D shown in FIG. 4A to FIG. 4D. It should be noted that, the image capturing unit of the projector 320 can sequentially obtain the captured images 303A, 303B, 303C and 303D according to the setting parameters such as different exposure values or shutter capture speed parameters. In the embodiment, the processing device 310 analyzes the captured images to separately determine whether the captured images meet the preset image condition.

In the embodiment, the preset image condition may be, for example, a calculation or analysis on a plurality of grayscale average values, a plurality of grid point quantities or light band areas of the captured images 303A, 303B, 303C and 303D. The processing device 310 can decide screen clarity for the captured images 303A, 303B, 303C and 303D by determining whether the grayscale average values are greater than a threshold value, determining whether the grid point quantities are equal to a preset quantity, or determining whether the light band areas are equal to a preset area. Here, the light band area is determined by checking whether an area in which all of the grayscale values being higher than the threshold value in the captured image is equal to the preset area. In other embodiments, the preset image condition may also be a default image condition. Accordingly, the processing device 310 can select one of the captured images 303A, 303B, 303C and 303D as the desired captured image according to the preset image condition. Also, the processing device 310 sets one of the setting parameters (e.g., settings like the exposure values or the shutter capture speed parameters) corresponding to the desired captured image as the desired setting parameter, and sets the image capturing units according to the desired setting parameter.

More specifically, the captured image 303C and the captured image 303D are difficult to recognize because some of the grid points in them are connected together due to exposure. On the other hand, it can be seen that the captured image 303A and the captured image 303B have the same grid point quantities. However, the grayscale average value of each of the grid points of the captured image 303B is higher than the threshold value, whereas the grayscale average value of each of the grid points of the captured image 303A is lower than the threshold value. Therefore, the processing device 310 will determine that a picture quality of the captured image 303B is higher than a picture quality of the captured image 303A. In this example, the processing devices 310 selects the captured image 303B as the desired captured image, and sets the setting parameter corresponding to the captured image 303B as the desired setting parameter. Accordingly, the processing device 310 of the embodiment is capable of automatically adjusting the image capturing unit of the projector 320. However, in an embodiment, if all of the captured images 303A, 303B, 303C and 303D fail to meet the reset image condition, the processing device 310 can further project a prompt image onto the projection plane S1 by the projection unit of the projector 320, so as to remind the user that the setting parameter of the projector 320 or an environmental factor are to be adjusted manually. The environmental factor may include an ambient light or other factors that may influence the projection. For example, a brightness of the ambient light may be adjusted to solve the issue, but the invention is not limited thereto.

Figure 5:
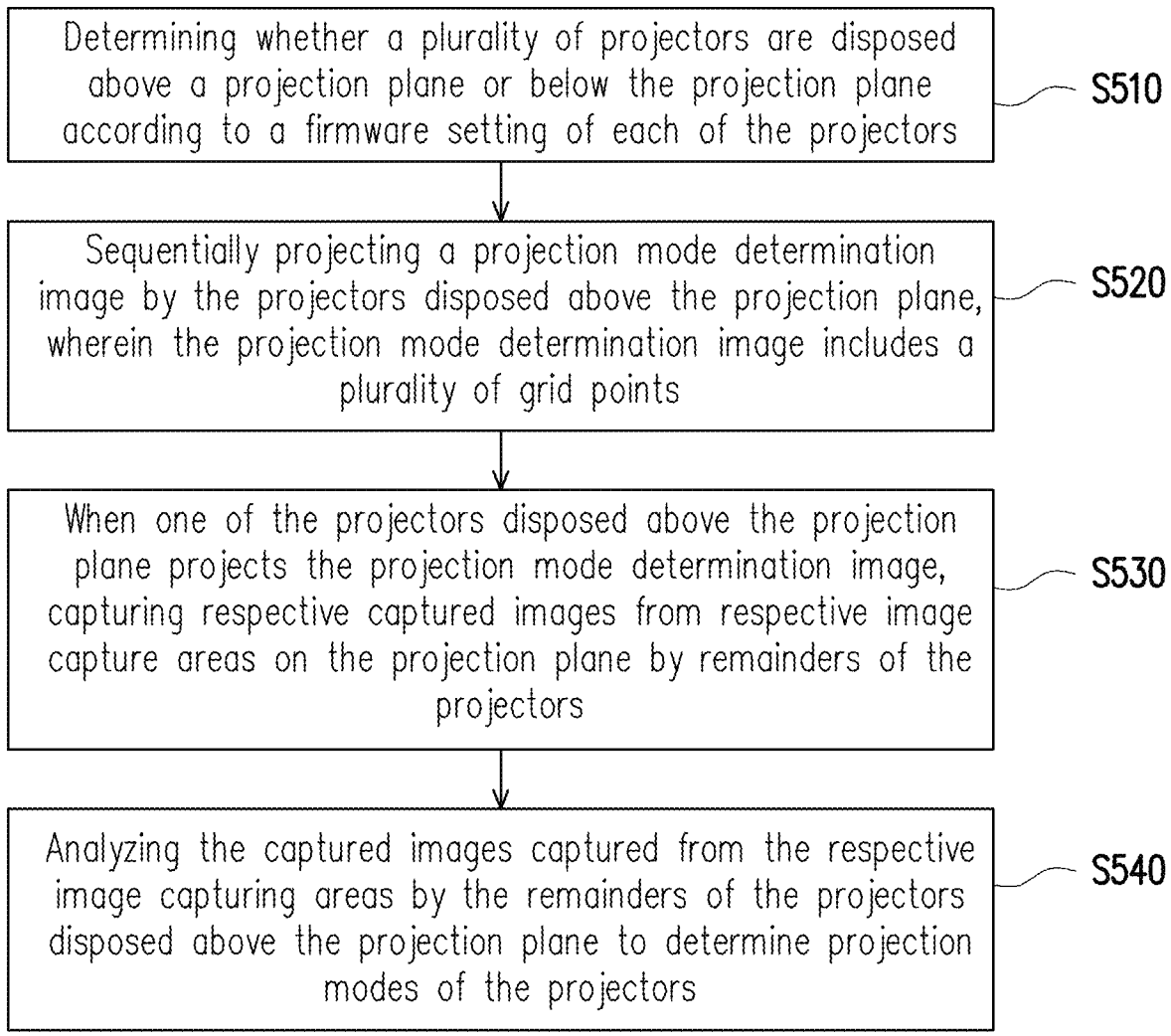
FIG. 5 is a flowchart illustrating an automatic setting method in another embodiment of the invention.

FIG. 5 is a flowchart illustrating an automatic setting method in another embodiment of the invention. With reference to FIG. 1 and FIG. 5, the automatic setting method of FIG. 5 is adapted to the projection system 100 of FIG. 1. In step S510, the processing device 110 determines whether a plurality of projectors are in a top-down projection mode or in a bottom-up projection mode (i.e., whether the projector is placed in an upside-down manner or the projector is placed in a normal manner) according to a firmware setting of each of the projectors, so as to know of whether the projectors are disposed above a projection plane or below the projection plane. In step S520, the processing device 110 sequentially projects a projection mode determination image by a part of the projectors 120_1, 120_2 to 120_N disposed above the projection plane, wherein the projection mode determination image includes a plurality of grid points. In step S530, when one of the projectors 120_1, 120_2 to 120_N disposed above the image plane projects the projection mode determination image, remainders of the image capturing units 122_1, 122_2 to 122_N of the projectors 120_1, 120_2 to 120_N obtain captured images from respective image capturing areas on the projection plane. In step S540, the processing device 110 analyzes the captured images captured from the respective image capturing areas by the remainders of the projectors 120_1, 120_2 to 120_N disposed above the projection plane or below the projection plane, so as to determine projection modes of the projectors 120_1, 120_2 to 120_N. In this way, the processing device 110 can automatically determine whether the image capturing units 122_1, 122_2 to 122_N project the same image frames overlapping with one another or separately project different image frames in order to automatically set contents for the image frames projected by the projectors 120_1, 120_2 to 120_N.

Further, in the embodiment, the processing device 110 can also determine a disposing sequence of each of the projectors 120_1, 120_2 to 120_N. In the embodiment, the processing device 110 can analyze a position of at least one of the grid points of the projection mode determination image in the captured images captured from the respective image capturing areas by the remainders of the projectors 120_1, 120_2 to 120_N disposed above the projection plane or below the projection plane, so as to determine the disposing sequence of each of the projectors 120_1, 120_2 to 120_N. In other words, when the user intends to set up the projectors 120_1, 120_2 to 120_N of the projection system 100, the user does not need to manually set the contents for the image frames to be respectively projected by the projectors 120_1, 120_2 to 120_N according to a disposed position of each of the projectors 120_1, 120_2 to 120_N. The projection system 100 of the invention can automatically determine the disposed position and the projection mode for each of the projectors 120_1, 120_2 to 120_N.

Description is provided below in more details using schematic diagrams of FIG. 6A to FIG. 6D in combination with the automatic setting method of FIG. 5.

Figure 6A:
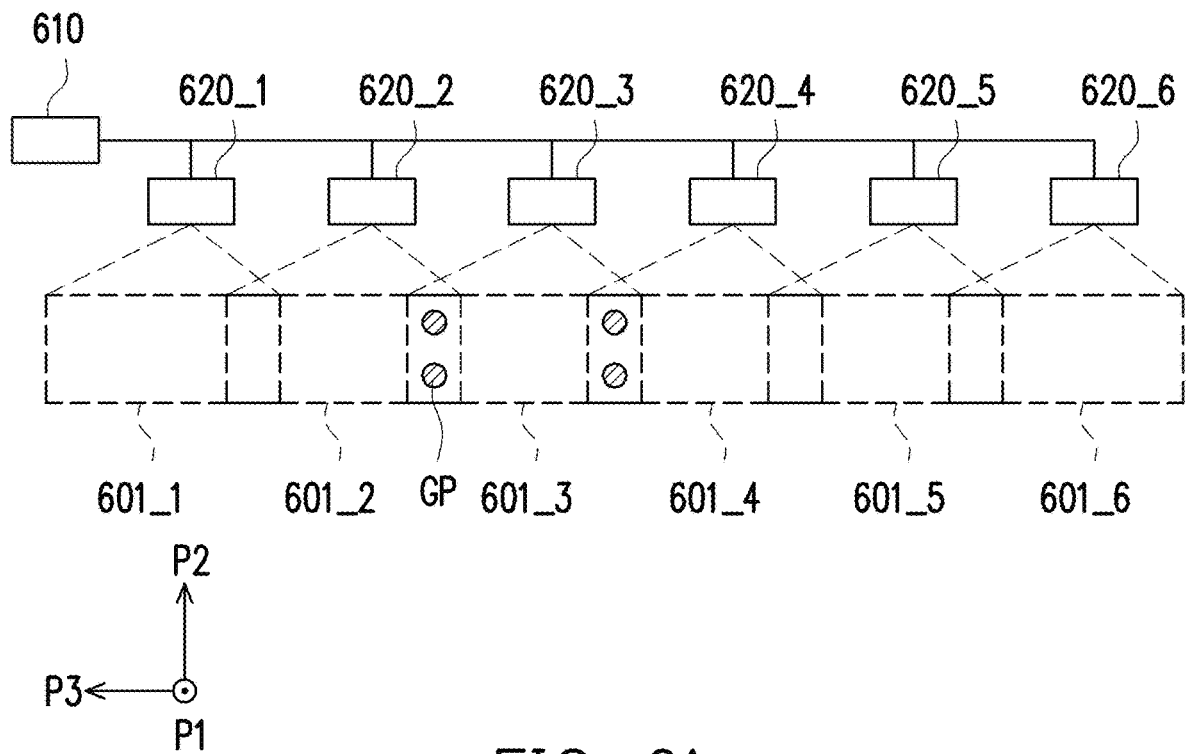
FIG. 6A is a schematic diagram illustrating a first projection mode of the projection system in an embodiment of the invention.

FIG. 6A is a schematic diagram illustrating a first projection mode of the projection system in an embodiment of the invention. With reference to FIG. 5 and FIG. 6A, in the embodiment, a processing device 610 is coupled to projectors 620_1 to 620_6. The projectors 620_1 to 620_6 sequentially project respective image frames on respective image capturing areas 601_1 to 601_6 on the projection plane S1. In the embodiment, the projectors 620_1 to 620_6 are disposed above the projection plane S1, but the invention is not limited thereto. In an embodiment, the projectors 620_1 to 620_6 may also be disposed below the projection plane S1.

In the embodiment, first of all, the processing device 610 executes step S510 so the projectors 620_1 to 620_6 can determine whether the disposed positions of the projectors 620_1 to 620_6 are above the projection plane S1 or below the projection plane S1 according to the respective firmware settings. Herein, the firmware settings may be preset by the user using an on screen display (OSD) adjusting function or remote controller of the projector or may be automatically determined by each of the projectors 620_1 to 620_6. Next, the processing device 610 executes step S520 so the projectors 620_1 to 620_6 can sequentially project the projection mode determination image on the corresponding image capturing areas 601_1 to 601_6. Then, the processing device 610 executes step S530, in which when one of the projectors 620_1 to 620_6 projects the projection mode determination image, the remainders of the projectors 620_1 to 620_6 obtain the respective captured images from the respective image capturing areas 601_1 to 601_6 on the projection plane S1. Lastly, the processing device 610 executes step S540, in which the processing device 610 analyzes the respective captured images captured from the respective image capturing areas by the remainders of the projectors 620_1 to 620_6 disposed above the projection plane S1, so as to determine the projection modes of the projectors 620_1 to 620_6.

For instance, when the projector 620_3 projects the projection mode determination image on the corresponding image capturing area 601_3, the remainders of the projectors (i.e., 620_1, 620_2, 620_4, 620_5 and 620_6) can simultaneously obtain the captured images from the respective image capturing areas (i.e., 601_1, 601_2, 601_4, 601_5 and 601_6). It should be noted, in the embodiment, the projection mode determination image may be an image frame on the image capturing area 601_3 as shown in FIG. 6A, and the projection mode determination image includes a plurality of grid points GP respectively in a left-side region and a right-side region. Accordingly, the processing device 610 can analyze the captured images captured from the respective image capturing areas (i.e., 601_1, 601_2, 601_4, 601_5 and 601_6) by the remainders of the projectors (i.e., 620_1, 620_2, 620_4, 620_5 and 620_6). In the embodiment, because none of the captured images captured by the remainders of the projectors (i.e., 620_1, 620_2, 620_4, 620_5 and 620_6) shows all of the grid points GP of the projection mode determination image, the processing device 610 can determine that the projector 620_3 does not have overlapping projection with the projectors 620_1, 620_2, 620_4, 620_5 and 620_6. By analogy, the processing device 610 can determine the projection modes of the projectors 620_1 to 620_6.

Figure 6B:
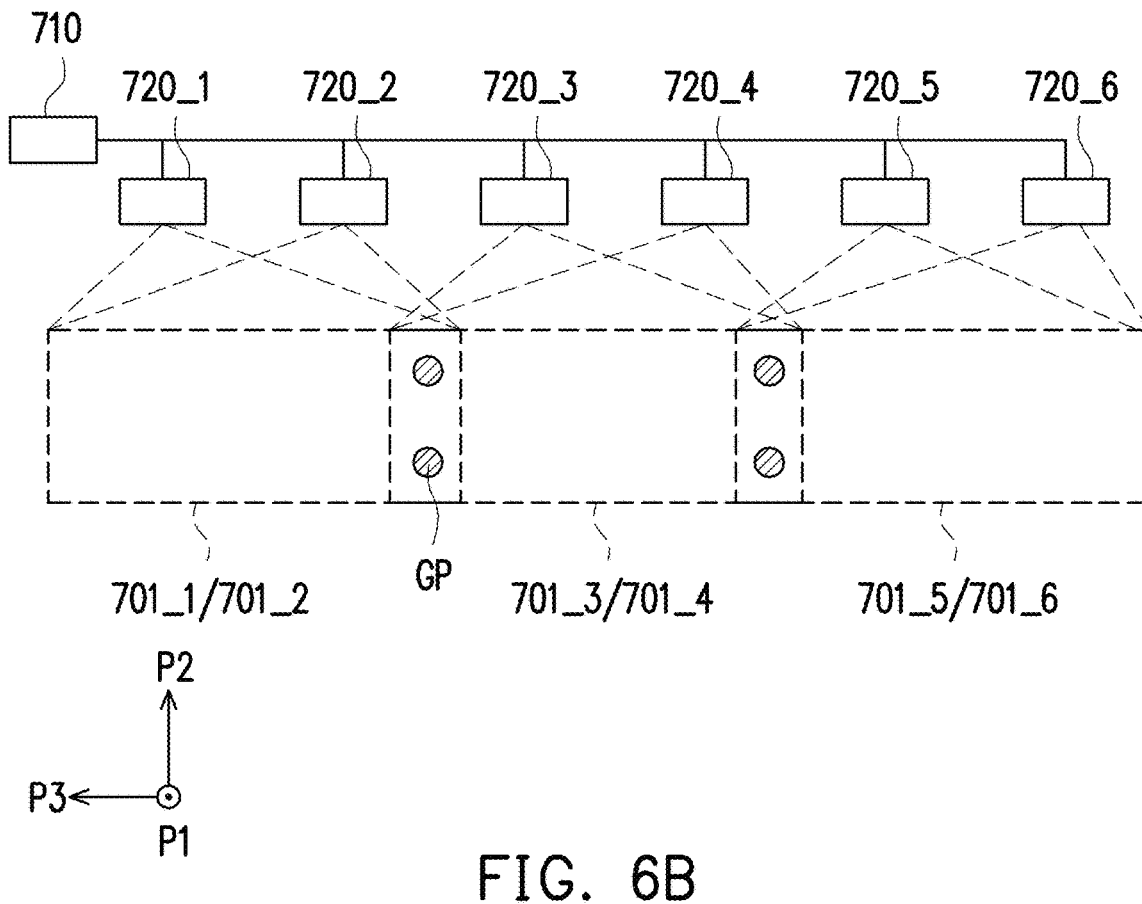
FIG. 6B is a schematic diagram illustrating a second projection mode of the projection system in an embodiment of the invention.

FIG. 6B is a schematic diagram illustrating a second projection mode of the projection system in an embodiment of the invention. With reference to FIG. 5 and FIG. 6B, in the embodiment, a processing device 710 is coupled to projectors 720_1 to 720_6. The projectors 720_1 to 720_6 sequentially project image frames on respective image capturing areas 701_1 to 701_6 on the projection plane S1. In the embodiment, the projectors 720_1 to 720_6 are disposed above the projection plane S1, but the invention is not limited thereto. In an embodiment, the projectors 720_1 to 720_6 may also be disposed below the projection plane S1.

In the embodiment, first of all, the processing device 710 executes step S510 so the projectors 720_1 to 720_6 can determine whether the disposed positions of the projectors 720_1 to 720_6 are above the projection plane S1 or below the projection plane S1 according to the respective finiware settings. Next, the processing device 710 executes step S520 so the projectors 720_1 to 720_6 can sequentially project the projection mode determination image on the corresponding image capturing areas 701_1 to 701_6. Then, the processing device 710 executes step S530, in which when one of the projectors 720_1 to 720_6 projects the projection mode determination image, the remainders of the projectors 720_1 to 720_6 obtain the respective captured images from the respective image capturing areas 701_1 to 701_6 on the projection plane S1. Lastly, the processing device 710 executes step S540, in which the processing device 710 analyzes the respective captured images captured from the respective image capturing areas by the remainders of the projectors 720_1 to 720_6 disposed above the projection plane S1, so as to determine the projection modes of the projectors 720_1 to 720_6.

For instance, when the projector 720_3 projects the projection mode determination image on the corresponding image capturing area 701_3, the remainders of the projectors (i.e., 720_1, 720_2, 720_4, 720_5 and 720_6) can simultaneously or sequentially obtain the captured images from the respective image capturing areas (i.e., 701_1, 701_2, 701_4, 701_5 and 701_6). It should be noted, in the embodiment, the projection mode determination image may be an image frame on the image capturing area 701_3 shown in FIG. 6B, and the projection mode determination image includes a plurality of grid points respectively in a left-side region and a right-side region. Accordingly, the processing device 710 can analyze the captured images captured from the respective image capturing areas (i.e., 701_1, 701_2, 701_4, 701_5 and 701_6) by the remainders of the projectors (i.e., 720_1, 720_2, 720_4, 720_5 and 720_6). In the embodiment, because the captured image captured by the projector 720_4 shows all of the grid points GP of the projection mode determination image, the processing device 710 can determine that the projector 720_3 has overlapping projection with the projector 720_4. However, because none of the captured images captured by the projector 720_1, 720_2, 720_5 and 720_6 shows all of the grid points GP of the projection mode determination image, the processing device 710 can determine that the projectors 720_1, 720_2, 720_5 and 720_6 do not have overlapping projection with the projectors 720_3 and 720_4. By analogy, the processing device 710 can determine the projection modes of the projectors 720_1 to 720_6. Incidentally, the overlapping projection of two projectors is applicable to special projection environments such as a darker projection environment or a projection plane with relatively poor reflective degree. With the same image frame repeatedly projected by the two projectors onto one image projection area, brightness or clearness of the image frame may be increased.

Further, in this example, the processing device 710 can further analyze the captured images captured from the respective image capturing areas (i.e., 701_1, 701_2, 701_4, 701_5 and 701_6) by the remainders of the projectors (i.e., 720_1, 720_2, 720_4, 720_5 and 720_6). In this example, because the projectors 720_1 and 720_2 project images on the image capturing areas 701_1 and 701_2 at an overlapping position, the projectors 720_1 and 720_2 may be regarded as one group without having differences in sequence. Similarly, the projectors 720_3 and 720_4 may be regarded as one group and the projectors 720_5 and 720_6 may be regarded as one group. In other words, because the captured images captured from the respective image capturing areas 701_1, 701_2, 701_5 and 701_6 by the image capturing units of the projectors 720_1, 720_2, 720_5 and 720_6 include a part of the grid points GP in the projection mode determination image projected by the projector 720_3, the processing device 710 can determine the positions of the part of the grid points GP shown in the captured images captured by the projectors 720_1, 720_2, 720_5 and 720_6, and then determine whether the image frames projected by the projectors 720_1, 720_2, 720_5 and 720_6 are overlapping with one another.

Figure 6C:
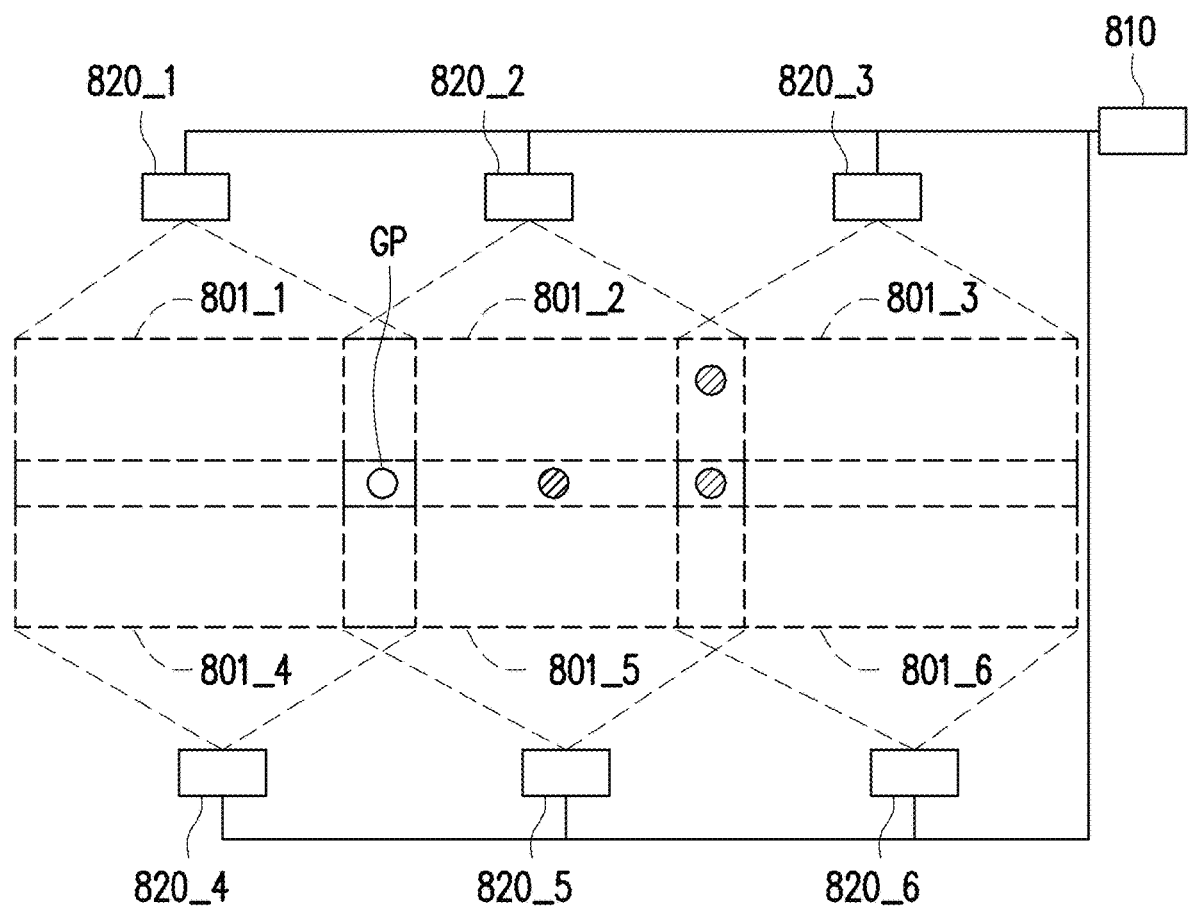
FIG. 6C is a schematic diagram illustrating a third projection mode of the projection system in an embodiment of the invention.
Figure 6D:
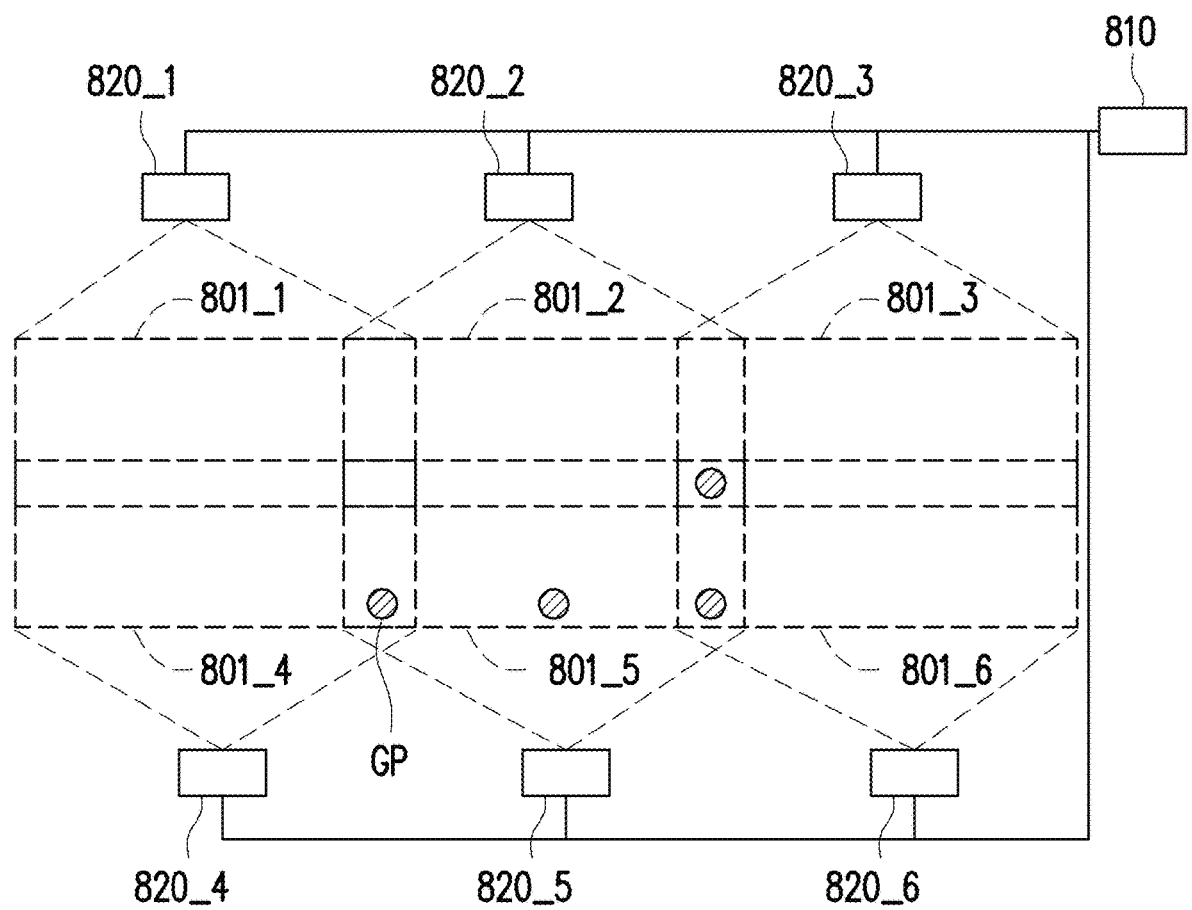
FIG. 6D is a schematic diagram illustrating a fourth projection mode of the projection system in an embodiment of the invention.

FIG. 6C is a schematic diagram illustrating a third projection mode of the projection system in an embodiment of the invention. FIG. 6D is a schematic diagram illustrating a fourth projection mode of the projection system in an embodiment of the invention. With reference to FIG. 5, FIG. 6C and FIG. 6D, in the embodiment, a processing device 810 is coupled to projectors 820_1 to 820_6. The projectors 820_1 to 820_6 sequentially project image frames on respective image capturing areas 801_1 to 801_6 on the projection plane S1. In the embodiment, the projectors 820_1 to 820_3 are disposed above the projection plane S1, and the projectors 820_4 to 820_6 are disposed below the projection plane S1.

In the embodiment, first of all, the processing device 810 executes step S510 so the projectors 820_1 to 820_6 can determine whether the disposed positions of the projectors 820_1 to 820_6 are above the projection plane S1 or below the projection plane S1 according to the respective firmware settings. Next, the processing device 810 executes step S520 so the projectors 820_1 to 820_6 can sequentially project the projection mode determination image on the corresponding image capturing areas 801_1 to 801_6. Then, the processing device 810 executes step S530, in which when one of the projectors 820_1 to 820_6 projects the projection mode determination image, the remainders of the projectors 820_1 to 820_6 obtain the respective captured images from the respective image capturing areas 801_1 to 801_6 on the projection plane S1. Lastly, the processing device 810 executes step S540, in which the processing device 810 analyzes the captured images captured from the respective image capturing areas by the remainders of the projectors 820_1 to 820_6 disposed above the projection plane S1, so as to determine the projection modes of the projectors 820_1 to 820_6.

Specifically, when the projector 820_2 projects the projection mode determination image on the corresponding image capturing area 801_2, the remainders of the projectors (i.e., 820_1, 820_3, 820_4, 820_5 and 820_6) can simultaneously obtain the captured images from the respective image capturing areas (i.e., 801_1, 801_3, 801_4, 801_5 and 801_6). It should be noted, in the embodiment, the projection mode determination image may be an image frame on the image capturing area 801_2 as shown in FIG. 6C, and the projection mode determination image includes a plurality of grid points GP respectively in a left-side region, a right-side region and a lower-side region. Here, the grid points GP are arranged in form of an L-shape. Accordingly, the processing device 810 can analyze the captured images captured from the respective image capturing areas (i.e., 801_1, 801_3, 801_4, 801_5 and 801_6) by the remainders of the projectors (i.e., 820_1, 820_3, 820_4, 820_5 and 820_6). In the embodiment, none of the captured images captured by the projectors 820_1, 820_3, 820_4, 820_5 and 820_6 shows all of the grid points GP of the projection mode determination image.

Further, in this example, the processing device 810 can further analyze the captured images captured from the respective image capturing areas (i.e., 801_1, 801_3, 801_4, 801_5 and 801_6) by the remainders of the projectors (i.e., 820_1, 820_3, 820_4, 820_5 and 820_6). In this example, because the captured images captured from the respective image capturing areas 801_1 and 801_3 by the image capturing units of the projectors 820_1 and 820_3 include a part of the grid points GP in the projection mode determination image projected by the projector 820_2, the processing device 810 can determine that the part of the grid points GP is shown in the captured images captured by the projectors 820_1 and 820_3 at a right-side position and a left-side position, respectively, and then determine that the projectors 820_1 and 820_3 are located on a left-side and a right-side of the projector 820_2, respectively. In this example, because the captured images captured from the respective image capturing areas 801_4 and 801_6 by the image capturing units of the projectors 820_4 and 820_6 include a part of the grid points GP in the projection mode determination image projected by the projector 820_2, the processing device 810 can determine that the part of the grid points GP is shown in the captured images captured by the projectors 820_4 and 820_6 at an upper-side position, and then determine that the projectors 820_4 and 820_6 are located on a lower-side of the projector 820_2. In addition, in the image capturing area 801_5 corresponding to the projector 820_5, since there are more grid points GP in the captured image captured by the projector 820_5 (than the grid pints GP in the other projectors) while the grid points GP in the captured image are located on an upper-side, it can be determined that the projector 820_5 is located right under the projector 820_2.

With reference to FIG. 6D, in this example, when the projector 820_5 projects the projection mode determination image in the corresponding image capturing area 801_5, the remainders of the projectors (i.e., 820_1, 820_2, 820_3, 820_4 and 820_6) simultaneously or sequentially obtain the captured images from the respective image capturing areas (i.e., 801_1, 820_2, 801_3, 801_4 and 801_6). In the embodiment, the projection mode determination image may be an image frame on the image capturing area 801_5 as shown in FIG. 6D, and the projection mode determination image includes a plurality of grid points GP respectively in a left-side region, a right-side region and an upper-side region. Here, the grid points GP are arranged in form of an L-shape. Because the captured images captured from the respective image capturing area 801_2 by the image capturing unit of the projector 820_2 includes a part of the grid points GP in the projection mode determination image projected by the projector 820_5, the processing device 810 can determine that the part of the grid points GP is shown in the captured image captured by the projectors 820_2 at a lower-side position, and then determine that the projector 820_2 is located right above the projector 820_5 based on the number and the position of the part of the grid points GP. Also, the processing device 810 can determine that the part of the grid points GP is also shown in the captured images captured by the projectors 820_4 and 820_6 at a right-side position and a left-side position, respectively, and then determine that the projectors 820_4 and 820_6 are located on a left-side and a right-side of the projector 820_5, respectively. In this example, in the captured images captured from the respective image capturing areas 801_1 and 801_3 by the image capturing units of the projectors 820_1 and 820_3, the part of the grid points GP in the projection mode determination image projected by the projector 820_5 is not captured by the projector 820_1. However, in the captured image captured from the respective image capturing area 801_3 by the image capturing unit of the projector 820_3, the part of the grid points GP in the projection mode determination image projected is captured. Therefore, the processing device 810 can determine that the part of the grid points is shown in the captured image captured by the projector 820_3 at a lower-side position, and then determine that the projector 820_3 is located on an upper-side of the projector 820_5. By analogy, after the projection mode determination image is sequentially projected by the projectors 820_1 to 820_6, the processing device 810 can determine disposing relations among the projectors 820_1 to 820_6 so as to determine the disposing sequence of each of the projectors 820_1 to 820_6.

Figure 7:
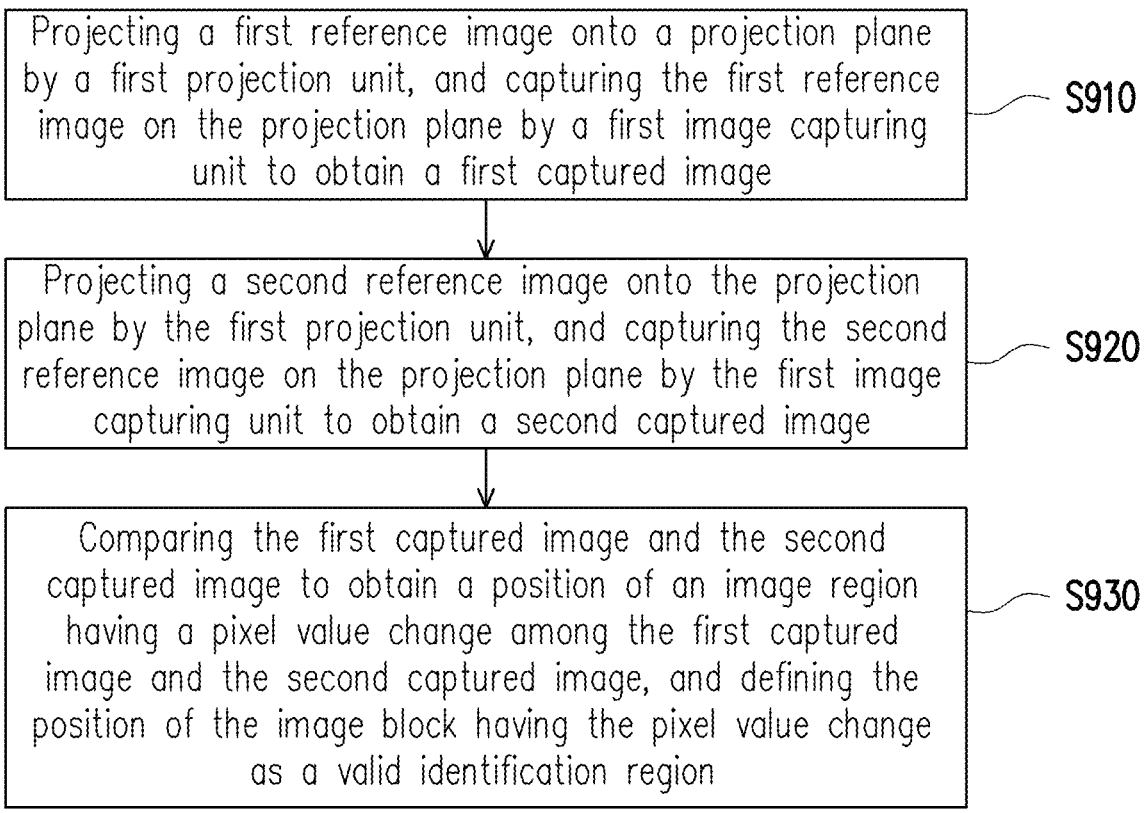
FIG. 7 is a flowchart illustrating an automatic setting method in another embodiment of the invention.

FIG. 7 is a flowchart illustrating an automatic setting method in another embodiment of the invention. With reference to FIG. 1 and FIG. 7, the automatic setting method of FIG. 7 is adapted to the projection system 100 of FIG. 1. In the embodiment, the projector 120_1 includes the projection unit 121_1 and the image capturing unit 122_1. In step S910, the processing device 110 projects a first reference image onto a projection plane by the projection unit 121_1, and captures the first reference image on the projection plane by the image capturing unit 122_1 to obtain a first captured image. In step S920, the processing device 110 projects a second reference image onto the projection plane by the projection unit 121_1, and captures the second reference image on the projection plane by the image capturing unit 122_1 to obtain a second captured image. In step S930, the processing device 110 is adapted to compare the first captured image and the second captured image to obtain a position of an image region having a pixel value change with a variation value greater than a preset value among the first captured image and the second captured image, and defines the position of the image region having the pixel value change as a valid identification region. By analogy, the same operation may also be executed for the projectors 120_2 to 120_N, where the pixel value is a technical term well-known by persons skilled in the art, which includes grayscale values, etc., but not limited thereto.

In other words, because a range of the image capturing unit 122_1 for capturing the captured image is greater than a range of the projection unit 121_1 for projecting the image frame, the captured image captured by the image capturing unit 122_1 may include a background image around the image frame. In the embodiment, the processing device 110 can automatically determine the valid identification region in the captured image captured by the image capturing unit 122_1. Accordingly, when the processing device 110 analyzes the captured image captured by the image capturing unit 122_1, the processing device 110 can simply process an image of the valid identification region instead of processing the entire captured image. In this way, the processing device 110 of the embodiment can effectively reduce time for image analysis and computing as well as data computing amount.

Description is provided below in more details using schematic diagrams of FIG. 8A to FIG. 8B in combination with the automatic setting method of FIG. 7.

Figure 8A:
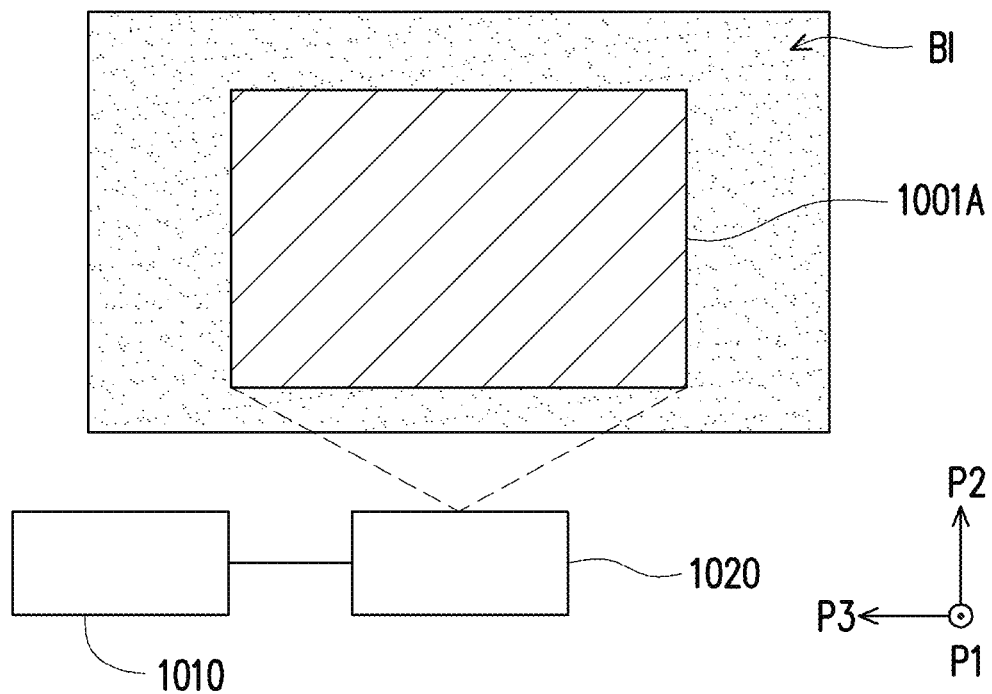
FIG. 8A is a schematic diagram illustrating a first reference image in an embodiment of the invention.

FIG. 8A is a schematic diagram illustrating a first reference image in an embodiment of the invention. With reference to FIG. 7, FIG. 8 and FIG. 8B, a processing device 1010 is coupled to a projector 1020. First of all, in FIG. 8A, a projection unit of the projector 1020 projects a first reference image 1001A onto a projection plane. In the embodiment, the first reference image 1001A may be, for example, a pure-white image or a pure-black image. Further, in the embodiment, an image capturing unit of the projector 1020 captures the image frame on the projection plane to obtain a corresponding first captured image. Next, in FIG. 8B, the projection unit of the projector 1020 projects a second reference image 1001B onto the projection plane S1. In the embodiment, the second reference image 1001B may be, for example, the pure-white image or the pure-black image different from the first reference image 1001A. Further, in the embodiment, the image capturing unit of the projector 1020 captures the image frame projected on the projection plane to obtain a corresponding second captured image.

Figure 8B:
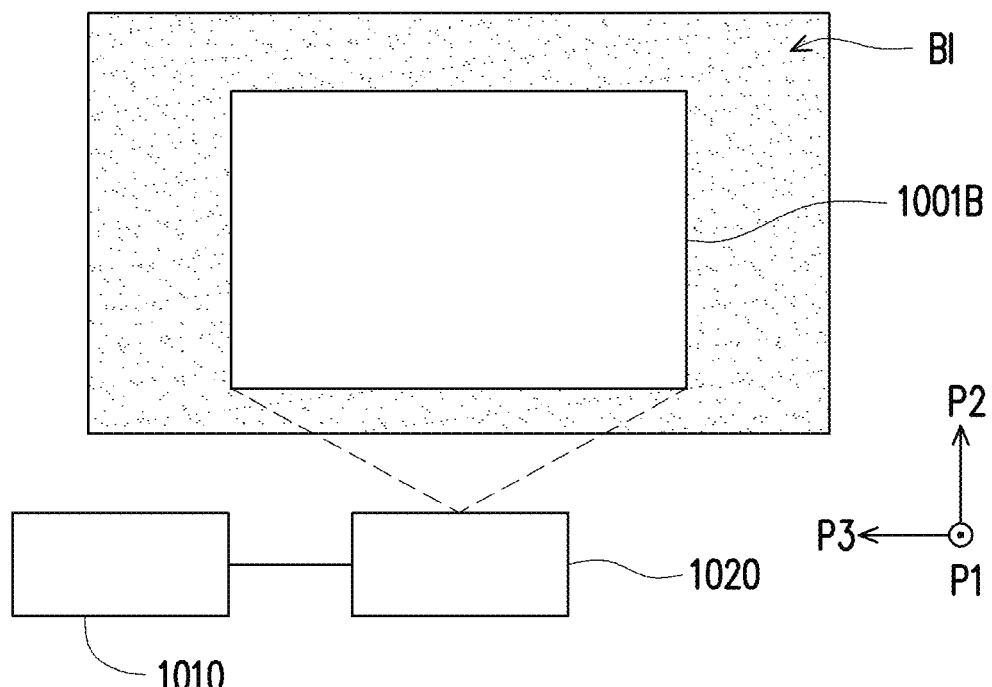
FIG. 8B is a schematic diagram illustrating a second reference image in an embodiment of the invention.

In the embodiment, as shown in FIG. 8A and FIG. 8B, with respect to the first captured image and the second captured image obtained by the processing device 1010, the first captured image includes the first reference image 1001A and a background image BI and the second captured image includes the second reference image 1001B and the background image BI. Accordingly, the processing device 1010 can subtract pixel values of the first captured image and the second captured image from each other to obtain a pixels-subtracted image. Also, the processing device 1010 can analyze the pixels-subtracted image to determine a region having the pixel values with the variation value greater than the preset value in the pixels-subtracted image, and define the region having the pixel values with the variation value greater than the preset value as the valid identification region. Relatively, the processing device 1010 can analyze the pixels-subtracted image to determine a region having the pixel values with the variation value less than the preset value in the pixels-subtracted image, and define the region having the pixel values with the variation value less than the preset value as a non-valid identification region. In this way, the processing device 1010 of the embodiment can automatically determine the valid identification region of the captured image captured by the projector 1020.

Figure 9:
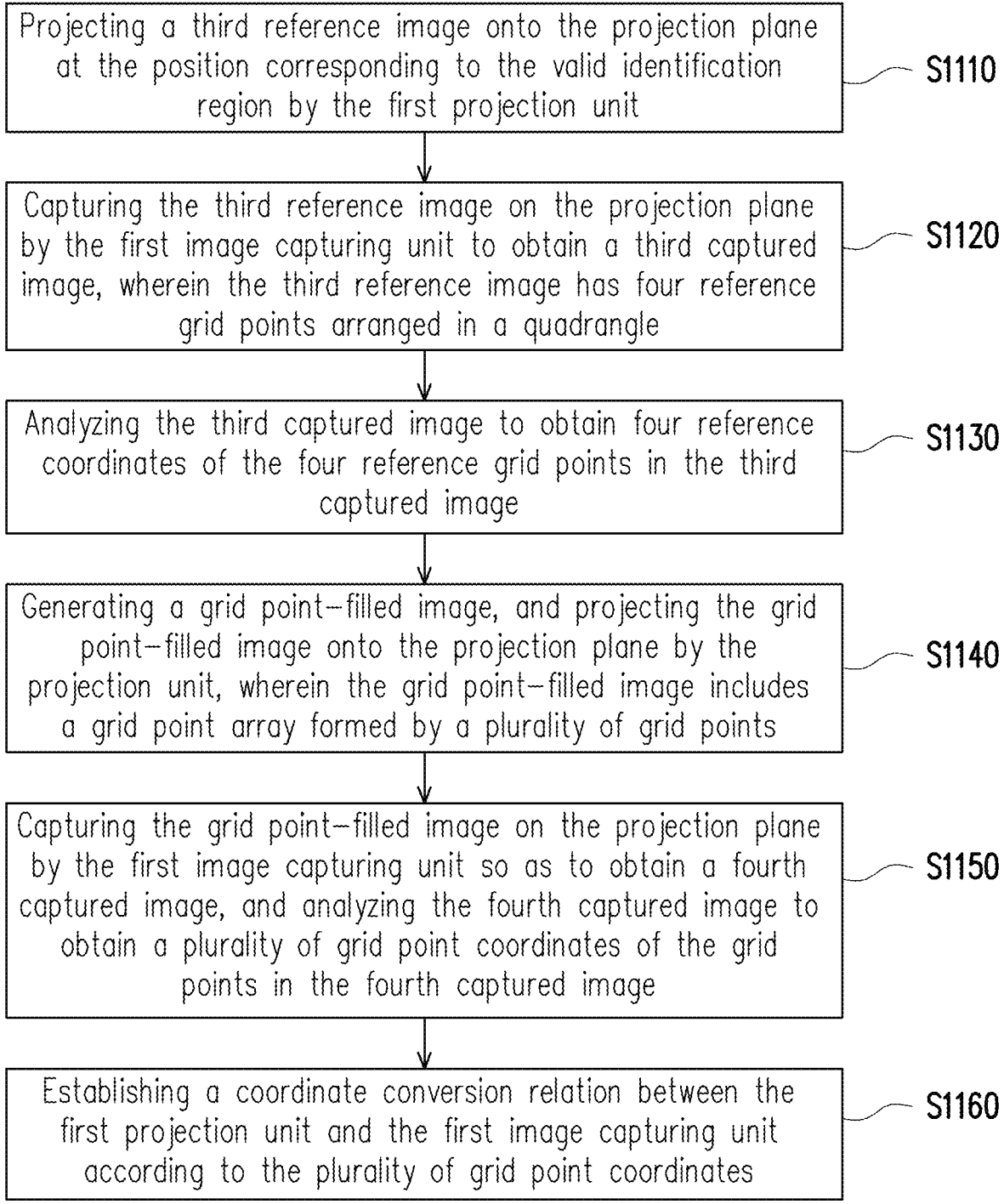
FIG. 9 is a flowchart illustrating an automatic setting method in another embodiment of the invention.

FIG. 9 is a flowchart illustrating an automatic setting method in another embodiment of the invention. With reference to FIG. 1 and FIG. 9, the automatic setting method of FIG. 9 is adapted to the projection system 100 of FIG. 1. It should be noted that the automatic setting method of FIG. 9 may be executed subsequent to step S930 of FIG. 7, but the invention is not limited thereto. In an embodiment, the automatic setting method of FIG. 9 may also be executed independently. In the embodiment, the projector 120_1 includes the projection unit 121_1 and the image capturing unit 122_1. In step S1110, the processing device 110 projects a third reference image onto the projection plane at the position corresponding to the valid identification region on the projection plane by the projection unit 121_1. In step S1120, the processing device 110 captures the third reference image on the projection plane by the image capturing unit 122_1 to obtain a third captured image. Here, the third reference image has four reference grid points arranged in a quadrangle, and located within the valid identification region. In step S1130, the processing device 110 analyzes the third captured image to obtain four reference coordinates of the four reference grid points in the third captured image. In step S1140, the processing device 110 generates a grid point-filled image according to the four reference coordinates of the four reference grid points, and projects the grid point-filled image onto the projection plane by the projection unit 121_1. Here, the grid point-filled image includes a grid point array formed by a plurality of grid points. In another embodiment, the four reference grid points may be a part of the grid point-filled image, and the grid point-filled image is an image preset according to a definition of the projector in the processing device. In step S1150, the processing device 110 captures a fourth captured image on the projection plane by the image capturing unit 122_1, and analyzes the fourth captured image to obtain a plurality of grid point coordinates of the grid points in the fourth captured image. In step S1160, the processing device 110 establishes a coordinate conversion relation between the projection unit 121_1 and the image capturing unit 122_1 according to the plurality of grid point coordinates. Accordingly, when the processing device 110 analyzes the captured image and the image frame, the processing device 110 can change a coordinate relation between the captured image and the image frame. By analogy, the projectors 120_2 to 120_N may also execute the same operation.

Description is provided below in more details using schematic diagrams of FIG. 10A to FIG. 10B in combination with the automatic setting method of FIG. 7.

Figure 10A:
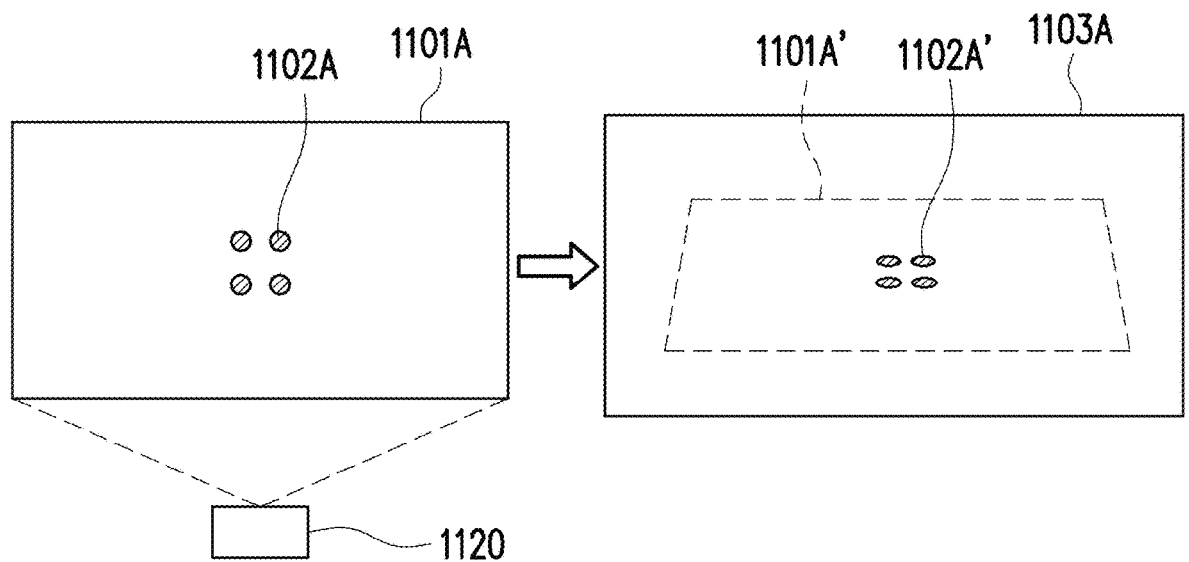
FIG. 10A is a schematic diagram illustrating a third reference image in an embodiment of the invention.

FIG. 10A is a schematic diagram illustrating a third reference image in an embodiment of the invention. FIG. 10B is a schematic diagram illustrating a fourth reference image in an embodiment of the invention. With reference to FIG. 9, FIG. 10A and FIG. 10B, a projector 1120 may be coupled to the processing device described in the foregoing embodiments. First of all, in FIG. 10A, the processing device executes step S1110 to drive the projector 1120 for projecting a third reference image 1101A onto the projection plane at the position corresponding to the valid identification region on the projection plane. In the embodiment, the processing device executes step S1120 to drive the projector 1120 for capturing the third reference image 1101A on the projection plane, so as to obtain a third captured image 1103A. Here, the third reference image 1101A includes four reference grid points 1102A arranged in a quadrangle. Accordingly, the third captured image 1103A includes a third reference image 1101A' and four references 1102A', which are tilted. In the embodiment, the processing device executes step S1130 to analyze the third captured image 1103A, so as to obtain four reference coordinates of the four reference grid points 1102A' in the third captured image 1103A. By doing so, the processing device can establish a coordinate conversion between the four reference grid points 1102A of the third reference image 1101A and the four reference grid points 1102A' of the third captured image 1103A.

Figure 10B:
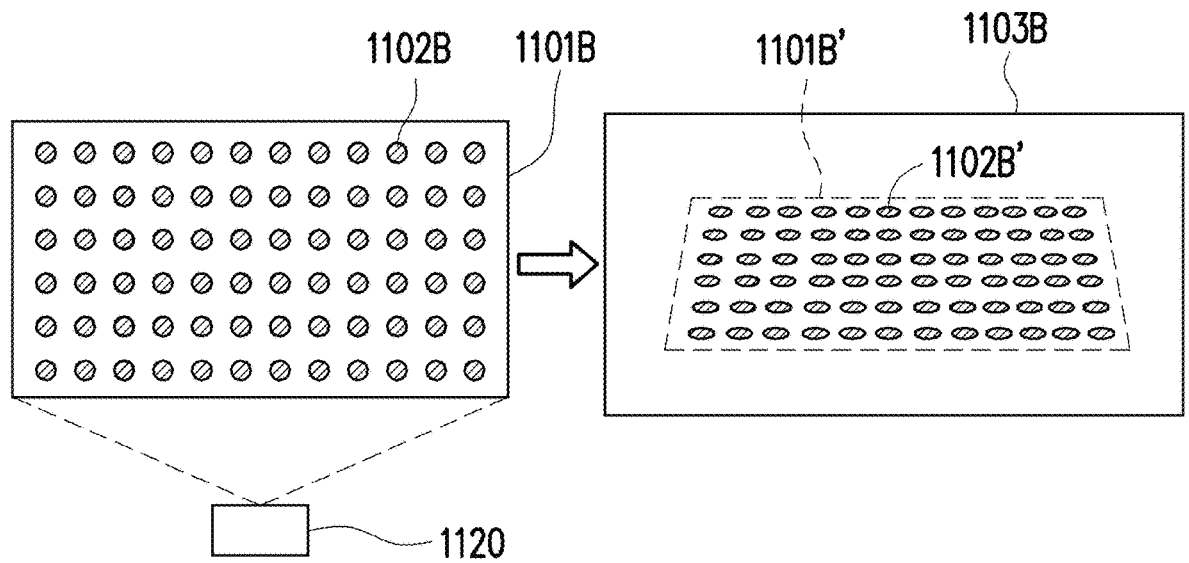
FIG. 10B is a schematic diagram illustrating a fourth reference image in an embodiment of the invention.

Next, in FIG. 10B, the processing device executes step 1140, in which the processing device generates a grid point-filled image 1101B, and projects the grid point-filled image 1101B onto the projection plane by the projector 1120. Here, the grid point-filled image 1101B includes a grid point array 1102B formed by a plurality of grid points. In the embodiment, the processing device executes step S1150 to drive the image capturing unit of the projector 1120 for capturing a fourth captured image 1103B on the projection plane, and analyzes the fourth captured image 1103B, so as to obtain each of grid point coordinates of a grid point array 1102B' of a grid point-filled image 1101B' in the fourth captured image 1103B. In the embodiment, the processing device executes step S1160 so the processing device can establish a coordinate conversion relation between the projection unit and the image capturing unit of the projector 1120 according to the grid point coordinates. In other words, because the image frame projected by the projection unit of the projector 1120 is not identical to the captured image captured by the image capturing unit, when the processing device analyzes the captured image, the processing device can convert coordinate positions for each point in the valid identification region in the captured image into coordinate positions corresponding to the image frame according to the coordinate conversion relation.

Figure 11:
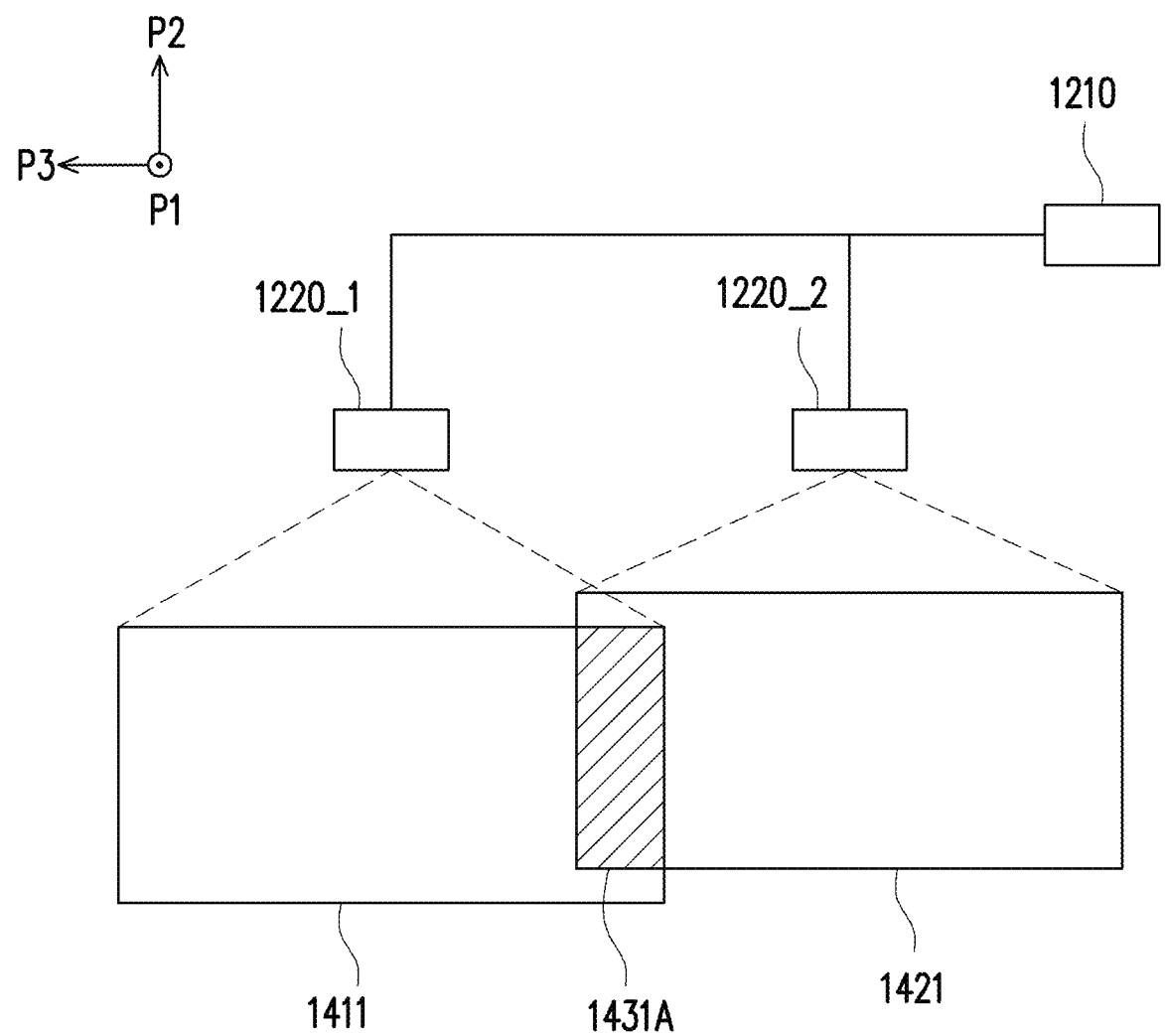
FIG. 11 is a schematic diagram illustrating two projectors in an embodiment of the invention.
Figure 12:
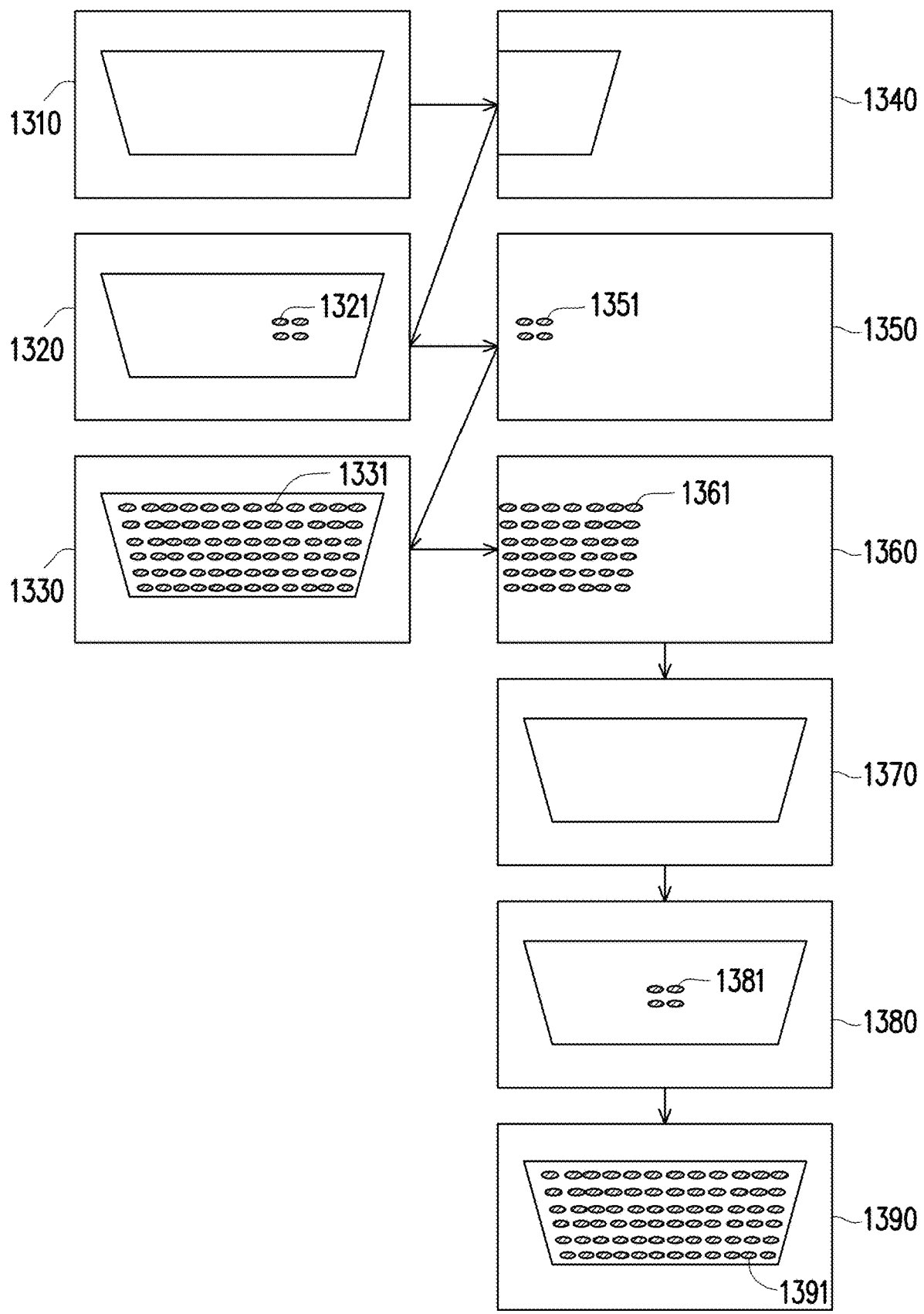
FIG. 12 is a schematic diagram illustrating a coordinate integration in the embodiment in FIG. 11.

FIG. 11 is a schematic diagram illustrating two projectors in an embodiment of the invention. FIG. 12 is a schematic diagram illustrating a coordinate integration in the embodiment in FIG. 11. It should be noted that, the automatic setting method described in the embodiment of FIG. 9 may also be applied in establishment of a coordinate system among multiple projectors. With reference to FIG. 11 and FIG. 12, a processing device 1210 is coupled to projectors 1220_1 and 1220_2 (two projectors are taken here as an example). In FIG. 11, an image projection area 1411 of the projector 1220_1 is partially overlapping with an image projection area 1421 of the projector 1220_2. There is an overlapping area 1431A between the image projection area 1411 and the image projection area 1421. In FIG. 12, an image capturing unit of the projector 1220_1 obtains captured images 1310 to 1330, and an image capturing unit of the projector 1220_2 obtains captured images 1340 to 1390.

Hereinafter, detailed description is provided with reference to the captured images 1310 to 1390 of FIG. 12. In the embodiment, when the projector 1220_1 projects the first reference image, the captured image 1310 is captured by the image capturing unit of the projector 1220_1. Meanwhile, the image capturing unit of the projector 1220_2 captures the first reference image projected by the projector 1220_1 to form the captured image 1340. Afterwards, the projector 1220_1 projects an image frame having reference grid points 1321. Meanwhile, the image capturing unit of the projector 1220_2 captures the image frame having the reference grid points 1321 projected by the projector 1220_1 to form the captured image 1350, and so on and so forth, as shown in FIG. 12.

The processing device 1210 analyzes the valid identification region in the captured image 1310, and then the processing device 1210 analyzes the valid identification region in the captured image 1340 captured by the image capturing unit of the projector 1220_2. In the embodiment, the projector 1220_1 projects the image frame having four reference grid points, where positions of the four reference grid points are closer to a right-side of the captured image 1320. The projector 1220_2 does not project an image frame, and yet the image capturing unit of the projector 1220_2 does capture the captured image 1350. Accordingly, each of the captured images 1320 and 1350 include four reference grid points (1321 and 1351). In the embodiment, the processing device 1210 analyzes the respective four reference grid points (1321 and 1351) in the captured images 1320 and 1350, so as to obtain four reference coordinates and another four reference coordinates of the respective four reference grid points (1321 and 1351) in coordinate systems of the projectors 1220_1 and 1220_2. In the embodiment, the projector 1220_1 projects a grid point-filled image. Here, the projector 1220_2 does not project an image frame, and yet the image capturing unit of the projector 1220_2 does capture the captured image 1360. Therefore, the captured images 1330 and 1360 include the respective grid point-filled images 1331 and 1361 respectively. In the embodiment, the projectors 1220_1 and 1220_2 analyze each grid point in the grid point-filled images 1331 and 1361 in the captured images 1330 and 1360, respectively, so as to obtain a plurality of grid point coordinates and another plurality of grid point coordinates for each grid point in the grid point-filled images 1331 and 1361.

In the embodiment, the projector 1220_2 continues to project an image frame so the operation for analyzing the captured images 1310 to 1330 by the projector 1220_1 can be executed. In the embodiment, the processing device 1210 analyzes four reference grid points 1381 in the captured image 1380, so as to obtain four reference coordinates of the four reference grid points 1381 in the coordinate system of the projector 1220_2. Further, the processing device 1210 analyzes each grid point in a grid point-filled image 1391 in the captured image 1390, so as to obtain a plurality of grid point coordinates for each grid point of the grid point-filled image 1391.

In other words, in the embodiment, the processing device 1210 can perform a coordinate matrix operation according to the obtained grid point coordinates, so as to obtain a coordinate conversion relation between the projection unit and the image capturing unit of the projector 1220_1, a coordinate conversion relation between the projection unit and the image capturing unit of the projector 1220_2 and a coordinate conversion relation between the projectors 1220_1 and 1220_2. Also, in the embodiment, the processing device 1210 can integrate the image projection area 1411 of the projector 1220_1 and the image projection area 1421 of the projector 1220_2 into one identical coordinate system. Nevertheless, enough teaching, suggestion, and implementation illustration for the coordinate conversion relations described in the embodiments of the invention may be obtained with reference to common knowledge in the related art, which is not repeated hereinafter.

Figure 13A:
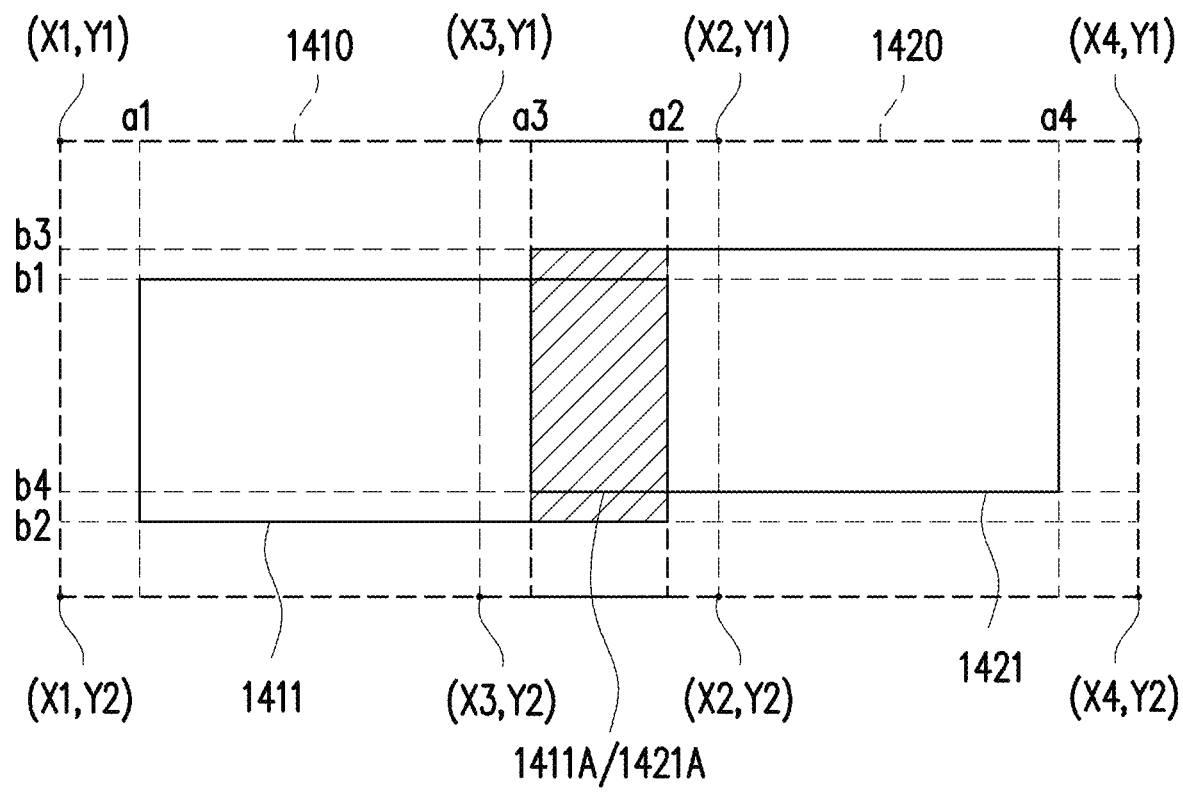
FIG. 13A is a schematic diagram illustrating two image projection areas overlapping with each other in the embodiment of FIG. 11.
Figure 13B:
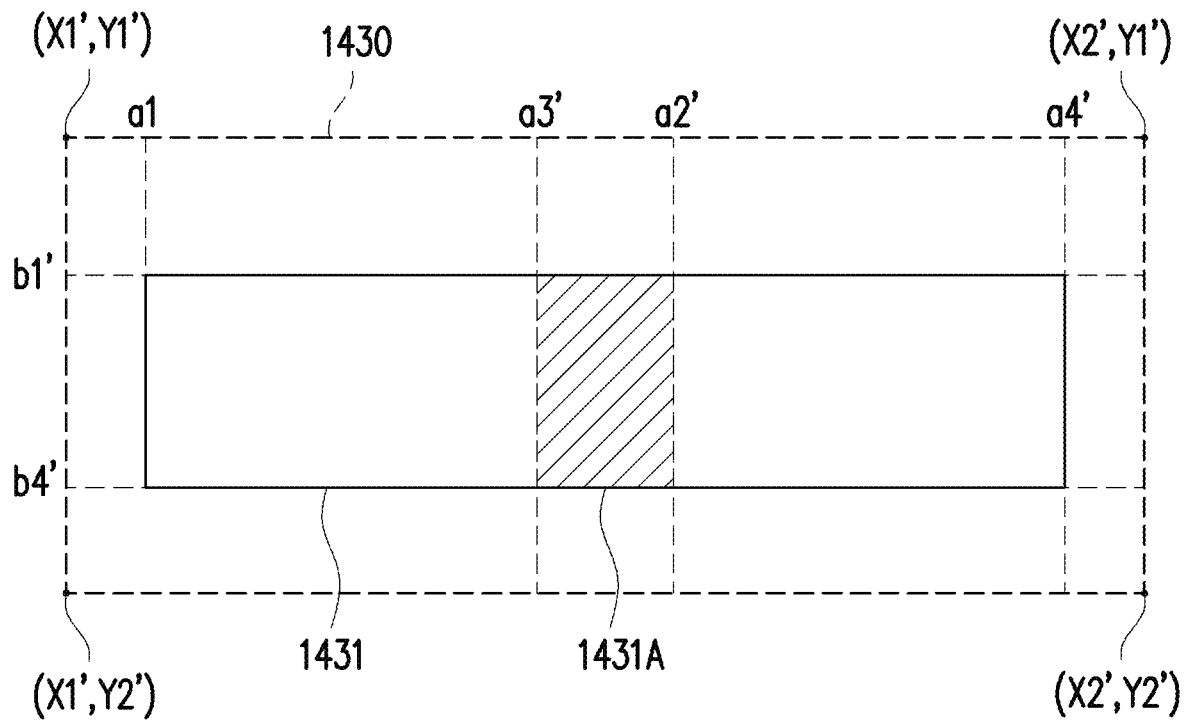
FIG. 13B is a schematic diagram illustrating an integrated image frame area in the embodiment of FIG. 11.

It should be noted that, in the embodiment, the processing device 1210 can perform a coordinate conversion on the captured images obtained by the projectors 1220_1 and 1220_2 according to each of the coordinate conversion relations, and adjust the captured images as shown in FIG. 13A and FIG. 13B to facilitate an image analysis in the following embodiments.

FIG. 13A is a schematic diagram illustrating two image projection areas overlapping with each other in the embodiment of FIG. 11. FIG. 13B is a schematic diagram illustrating an integrated image frame area in the embodiment of FIG. 11. With reference to FIG. 11, FIG. 13A and FIG. 13B, in the embodiment, image capturing areas 1410 and 1420 of the projectors 1220_1 and 1220_2 are partially overlapping with each other, and the image projection areas 1411 and 1421 (illustrated by solid lines) have overlapping areas 1411A/1421A. In FIG. 13A, before the projectors 1220_1 and 1220_2 are integrated into the identical coordinate system, four vertex coordinates of the image capturing area 1410 are (X1, Y1), (X2, Y1), (X1, Y2) and (X2, Y2), respectively. Four vertex coordinates of the image capturing area 1420 are (X3, Y1), (X4, Y1), (X3, Y2) and (X4, Y2), respectively. For the processing device 1210, the coordinate system of the image capturing area 1410 of the projector 1220_1 is different from that of the image capturing area 1420 of the projector 1220_2.

For instance, the image capturing area 1410 and the image capturing area 1420 are located at the same height in a horizontal direction, but not limited thereto. Definitions of the image capturing units of the projectors 1220_1 and 1220_2 are 752×480 pixels. In other words, the vertex coordinates (X1, Y1), (X2, Y1), (X1, Y2) and (X2, Y2) of the image capturing area 1410 may be (0,0), (752,0), (0,480) and (752,480), respectively, and the vertex coordinates (X3, Y1), (X4, Y1), (X3, Y2) and (X4, Y2) of the image capturing area 1420 may also be (0,0), (752,0), (0,480) and (752,480), respectively. In this example, the image projection area 1411 and the image projection area 1421 are not located at the same height in the horizontal direction, and the image projection area 1411 and the image projection area 1421 have the overlapping areas 1411A/1421A.

In this example, sizes of the image projection area 1411 and the image projection area 1421 are 480×360. Taking the coordinate system of the image capturing area 1410 for example, left and right borders of the image projection area 1411 are, for example, located at positions where a border a1=136 and a border a2=616 in the coordinate system of the image capturing area 1410, and upper and lower borders of the image projection area 1411 are, for example, located at positions where a border b1=100 and a border b2=460 in the coordinate system of the image capturing area 1410. Taking the coordinate system of the image capturing area 1420 for example, left and right borders of the image projection area 1421 are, for example, located at positions where a border a3=136 and a border a4=616 in the coordinate system of the image capturing area 1420, and upper and lower borders of the image projection area 1421 are, for example, located at positions where a border b3=60 and a border b4=420 in the coordinate system of the image capturing area 1410.

In this example, the processing device 1210 can determine that the image projection area 1411 and the image projection area 1421 have the image overlapping areas 1411A/1421A in the horizontal direction. Also, the processing device 1210 separately adjusts a luminance value of a partial image frame (the image overlapping area 1411A of the image projection area 1411) projected by the projector 1220_1 and a luminance value of another partial image frame (the image overlapping area 1421A of the image projection area 1421) projected by the projector 1220_2 in the image overlapping areas 1411A/1421A. In other words, the processing device 1210 can determine area sizes of the image projection area 1411 and the image projection area 1421 respectively occupied by the image overlapping areas 1411A/1421A, and lower the luminance values of the image frames in the image overlapping areas 1411A/1421A for the projectors 1220_1 and 1220_2, so as to prevent the brightness of the image frames in the image overlapping areas 1411A/1421A from being overly bright.

Also, the processing device 1210 can further determine a maximum horizontal distance (from a1 to a4) and a minimum vertical distance (from b1 to b4) respectively in a horizontal direction and a vertical direction of the boundaries of the image projection area 1411 and the image projection area 1421. As such, in this example, the processing device 1210 decides an integrated image frame area 1431 as shown in FIG. 13B according to the maximum horizontal distance (from a1 to a4) and the minimum vertical distance (from b1 to b4).

Specifically, the processing device 1210 can execute the integration operation for the coordinate system of FIG. 12 to integrate the image capturing area 1410 and the image capturing area 1420 into an image capturing area 1430. In this example, a size of the image capturing area 1430 is 1072×480, and a size of the integrated image frame area 1431 is 800×280. Left and right borders of the image projection area 1431 are, for example, located at positions where a border $a1'=136$ and a border $a4'=936$ in a coordinate system of the image capturing area 1430, and upper and lower borders of the image projection area 1411 are, for example, located at positions where a border $b1'=100$ and a border $b4'=380$ in the coordinate system of the image capturing area 1430. Also, left and right borders of the image overlapping area 1431A are, for example, located at positions where border $a3'=456$ and a border $a2'=616$ in the coordinate system of the image capturing area 1430. In other words, the processing device 1210 can automatically integrate the image projection areas 1411 and 1421 of the projectors 1220_1 and 1220_2 into the integrated image frame area 1431 so one integrated image frame can be displayed onto the projection plane. Further, in the embodiment, the processing device 1210 can calculate an overlapping image ratio of the image overlapping area 1431A in the horizontal direction, which is 20% (i.e., (616-456)/(936-136)). According to the overlapping image ratio of the image overlapping area 1431A in the horizontal direction, the processing device 1210 can automatically adjust the brightness of the image frame in 20% of the image projection area 1411 on the right-side and can automatically adjust the brightness of the image frame in 20% of the image projection area 1421 on the left-side so the integrated image frame displayed in the integrated image frame area 1431 can have the effectiveness of even brightness.

In summary, with the projection system and the automatic setting method thereof according to the invention, the respective setting parameters of multiple projectors of the projection system may be automatically set, and the projection modes and the disposing sequences of the projectors may also be automatically determined such that the projection system can be easily set up based on various projection requirements. Moreover, with the projection system and the automatic setting method thereof according to the invention, the image frames of the projectors of the projection system may be automatically adjusted and the size ranges of the image frames of the projectors may also be automatically adjusted such that the image frames of the projectors may be integrated into one integrated image frame with favorable projection quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An automatic setting method, adapted to a projection system, wherein the projection system comprises a processing device and a first projector, the first projector comprises a first projection unit and a first image capturing unit, and the automatic setting method comprises:

projecting a first reference image onto a projection plane by the first projection unit, and capturing the first reference image on the projection plane by the first image capturing unit to obtain a first captured image, wherein the first captured image comprises the first reference image and a background image; projecting a second reference image onto the projection plane by the first projection unit, and capturing the second reference image on the projection plane by the first image capturing unit to obtain a second captured image, wherein the second captured image comprises the second reference image and the background image; and comparing the first captured image and the second captured image to obtain a position of an image region having a pixel value change among the first captured image and the second captured image, wherein pixel values of a plurality of pixels of the first captured image and the second captured image are subtracted from each other to obtain a pixels-subtracted image, and the pixels-subtracted image is analyzed to determine:

a region having the pixel values greater than a threshold value in the pixels-subtracted image, wherein the region is defined as a valid identification region, and the valid identification region is associated with an area of the projection plane onto which the first reference image and the second reference image are projected; or a region having the pixel values less than the threshold value in a pixels-subtracted image, wherein the region is defined as a non-valid identification region, and the non-valid identification region is associated with the background image, and defining the position of the image region having the pixel values greater than the threshold value in the pixels-subtracted image.

2. The automatic setting method according to claim 1, wherein the first reference image is a pure-white image, and the second reference image is a pure-black image.

3. The automatic setting method according to claim 1, further comprising:

projecting a third reference image onto the projection plane at the position corresponding to the valid identification region by the first projection unit;

capturing the third reference image on the projection plane by the first image capturing unit to obtain a third captured image, wherein the third reference image has four reference grid points arranged in a quadrangle;

analyzing the third captured image to obtain four reference coordinates of the four reference grid points in the third captured image;

generating a grid point-filled image according to the four reference coordinates of the four reference grid points, and projecting the grid point-filled image onto the projection plane by the projection unit, wherein the grid point-filled image comprises a grid point array formed by a plurality of grid points;

capturing the grid point-filled image on the projection plane by the first image capturing unit so as to obtain a fourth captured image, and analyzing the fourth captured image to obtain a plurality of grid point coordinates of the grid points in the fourth captured image; and establishing a first coordinate conversion relation between the first projection unit and the first image capturing unit according to the plurality of grid point coordinates.

4. The automatic setting method according to claim 3, wherein the projection system further comprises a second projector, and the second projector comprises a second projection unit and a second image capturing unit, wherein a first image projection area of the first projector is partially overlapping with a second image projection area of the second projector, and the automatic setting method further comprises:

capturing a part of the third reference image on the projection plane by the second image capturing unit to obtain a fifth captured image;

analyzing the fifth captured image to obtain another four reference coordinates of the four reference grid points in the fifth captured image; and establishing a second coordinate conversion relation between the first projector and the second projector according to the four reference coordinates and the another four reference coordinates of the four reference grid points.

5. The automatic setting method according to claim 4, further comprising:

capturing the fourth reference image on the projection plane by the second image capturing unit to obtain a sixth captured image;

analyzing the sixth captured image to obtain another plurality of grid point coordinates of the grid points in the sixth captured image; and integrating the plurality of grid point coordinates in the first image projection area and the another plurality of grid point coordinates in the second image projection area into one identical coordinate system according to the coordinate conversion relations.

6. The automatic setting method according to claim 5, further comprising:

determining image overlapping areas of the first image projection area and the second image projection area, so as to separately adjust a first luminance value of a partial projection image projected by the first projector and a second luminance value of another partial projection image projected by the second projector in the image overlapping areas.

7. The automatic setting method according to claim 6, further comprising:

determining a maximum horizontal distance and a minimum vertical distance respectively in a horizontal direction and a vertical direction of a plurality of boundaries of the first image projection area and the second image projection area; and deciding an integrated projection image area according to the maximum horizontal distance and the minimum vertical distance.

8. A projection system, comprising:

a processing device; and a first projector, coupled to the processing device, and the first projector comprising:

a first projection unit, configured to project a first reference image onto a projection plane; and a first image capturing unit, configured to capture the first reference image on the projection plane to obtain a first captured image, wherein the first captured image comprises the first reference image and a background image, wherein the first projection unit projects a second reference image onto the projection plane through the processing device, and the first image capturing unit captures the second reference image on the projection plane through the processing device to obtain a second captured image, wherein the second captured image comprises the second reference image and the background image, wherein the processing device processes pixel values of a plurality of pixels of the first captured image and the second captured image subtracting from each other to obtain a pixels-subtracted image, the processing device analyzes the pixels-subtracted image to determine;

a region having the pixel values greater than a threshold value in the pixels-subtracted image, wherein the region is defined as a valid identification region, and the valid identification region is associated with an area of the projection plane onto which the first reference image and the second reference image are projected; or a region having the pixel values less than the threshold value in a pixels-subtracted image, wherein the region is defined as a non-valid identification region, and the non-valid identification region is associated with the background image, the processing device is adapted to compare the first captured image and the second captured image to obtain a position of an image region having a pixel value change among the first captured image and the second captured image, and the processing device defining the position of the image region having the pixel values greater than the threshold value in the pixels-subtracted image.

9. The projection system according to claim 8, wherein the first reference image is a pure-white image, and the second reference image is a pure-black image.

10. The projection system according to claim 9, wherein the processing device subtracts pixel values of a plurality of pixels of the first captured image and the second captured image from each other to obtain a pixels-subtracted image, the processing device analyzes the pixels-subtracted image to determine a region having the pixel values greater than a threshold value in the pixels-subtracted image, and the processing device defines the region having the pixel values greater than the threshold value as the valid identification region.

11. The projection system according to claim 10, wherein the processing device analyzes the pixels-subtracted image to determine a region having the pixel values less than the threshold value in the pixels-subtracted image, and the processing device defines the region having the pixel values less than the threshold value as a non-valid identification region.

12. The projection system according to claim 8, wherein the processing device projects a third reference image onto the projection plane at the position corresponding to the valid identification region by the first projection unit,
wherein the processing device captures the third reference image on the projection plane by the first image capturing unit to obtain a third captured image, wherein the third reference image has four reference grid points arranged in a quadrangle,
wherein the processing device analyzes the third captured image to obtain four reference coordinates of the four reference grid points in the third captured image,
wherein the processing device projects the grid point-filled image onto the projection plane by the projection unit, wherein the grid point-filled image comprises a grid point array formed by a plurality of grid points,
wherein the processing device captures the grid point-filled image on the projection plane by the first image capturing unit so as to obtain a fourth captured image of the projection plane, and analyzes the fourth captured image to obtain a plurality of grid point coordinates of the grid points in the fourth captured image,
wherein the processing device establishes a first coordinate conversion relation between the first projection unit and the first image capturing unit according to the plurality of grid point coordinates.

13. The projection system according to claim 12, further comprising:
a second projector, coupled to the processing device, wherein the second projector comprises:
a second projection unit; and
a second image capturing unit, configured to capture a part of the third reference image on the projection plane to obtain a fifth captured image,
wherein the processing device analyzes the fifth captured image to obtain another four reference coordinates of the four reference grid points in the fifth captured image,
wherein the processing device establishes a second coordinate conversion relation between the first projector and the second projector according to the four reference coordinates and the another four reference coordinates of the four reference grid points.

14. The projection system according to claim 13, wherein the processing device captures the fourth reference image on the projection plane by the second image capturing unit to obtain a sixth captured image,
wherein the processing device analyzes the sixth captured image to obtain another plurality of grid point coordinates of the grid points in the sixth captured image,
wherein the processing device integrates the plurality of grid point coordinates in the first image projection area and the another plurality of grid point coordinates in the second image projection area into one identical coordinate system according to the coordinate conversion relations.

15. The projection system according to claim 14, wherein the processing device determines image overlapping areas of the first image projection area and the second image projection area, so as to separately adjust a first luminance value of a partial projection image projected by the first projector and a second luminance value of another partial projection image projected by the second projector in the image overlapping areas.

16. The projection system according to claim 15, wherein the processing device determines a maximum horizontal distance and a minimum vertical distance respectively in a horizontal direction and a vertical direction of a plurality of boundaries of the first image projection area and the second image projection area,
wherein the processing device decides an integrated projection image area according to the maximum horizontal distance and the minimum vertical distance.

* * * * *